(12) United States Patent
Chalenko

(10) Patent No.: US 9,429,824 B2
(45) Date of Patent: Aug. 30, 2016

(54) UNIVERSAL ADJUSTABLE LENS ADAPTER

(71) Applicant: Vadym Chalenko, Chicago, IL (US)

(72) Inventor: Vadym Chalenko, Chicago, IL (US)

( * ) Notice: Subject to any disclaimer, the term of this patent is extended or adjusted under 35 U.S.C. 154(b) by 0 days.

(21) Appl. No.: 14/988,486

(22) Filed: Jan. 5, 2016

(65) Prior Publication Data
US 2016/0131965 A1     May 12, 2016

Related U.S. Application Data

(63) Continuation-in-part of application No. 14/844,265, filed on Sep. 3, 2015, which is a continuation of application No. 14/332,077, filed on Jul. 15, 2014, now Pat. No. 9,195,120.

(60) Provisional application No. 61/858,034, filed on Jul. 24, 2013.

(51) Int. Cl.
*G02B 7/02*     (2006.01)
*G03B 21/14*    (2006.01)
*G03B 17/56*    (2006.01)

(52) U.S. Cl.
CPC .............. *G03B 17/566* (2013.01); *G02B 7/14* (2013.01); *G03B 17/563* (2013.01); *G03B 17/565* (2013.01); *G02B 7/023* (2013.01); *G02B 7/026* (2013.01); *G03B 5/02* (2013.01); *G03B 5/04* (2013.01); *G03B 17/568* (2013.01)

(58) Field of Classification Search
CPC .......... G03B 5/02; G03B 5/04; G03B 17/48; G03B 17/56; G03B 17/563; G03B 17/565; G03B 17/566; G03B 17/568; G03B 21/14; G03B 21/142; G03B 21/145; G02B 7/02; G02B 7/023; G02B 7/026; G02B 7/14

USPC ........ 359/811, 813, 819, 818, 822; 396/387, 396/395, 446; 248/476; 353/100, 101; 355/55, 63

See application file for complete search history.

(56) References Cited

U.S. PATENT DOCUMENTS 3,527,454 A   9/1970  Humm
4,757,374 A   7/1988  Ramsay
(Continued)

OTHER PUBLICATIONS

Beastgrip Pro User Guide (beastgrip.com) Mar. 10, 2015 [online], [retrieved from internet on Feb. 29, 2016)] <URL:https://web.archive.org/web/20150310115750/http://beastgrip.com/pages/user-guide > entire document especially pp. 1-7.

*Primary Examiner* — Loha Ben
(74) *Attorney, Agent, or Firm* — Mercedes V. O'Connor

(57) ABSTRACT

A universal adjustable lens adapter and rig system for smartphones, or similar electronic devices, that is modular in nature and provides a component for manipulating and stabilizing the smartphone. The universal adjustable lens adapter includes a clamp mount assembly, a lens mount assembly, and a handle assembly that includes a clamp mount support that is adjustably and removably connected to a lens mount support. The clamp mount assembly provides a component for securing a smartphone, while the lens mount assembly provides a component for securing a camera lens. The clamp mount assembly includes an adjustable first clamp and an adjustable second clamp between which the smartphone is secured. Both the clamp mount assembly and the lens mount assembly are slidably connected to the handle assembly, such that the camera lens of any smartphone can be properly aligned with the camera lens attached to the lens mount assembly.

15 Claims, 22 Drawing Sheets

(56) References Cited

U.S. PATENT DOCUMENTS

| | | |
|---|---|---|
| 7,357,518 B2 | 4/2008 | Iinuma |
| 8,189,279 B2 | 5/2012 | Chen |
| 8,454,246 B2 | 6/2013 | Wood |
| 9,195,120 B2 * | 11/2015 | Chalenko ............ G03B 17/566 |
| 2010/0202067 A1 | 8/2010 | Chen |
| 2015/0029604 A1 | 1/2015 | Chalenko |
| 2016/0004028 A1 * | 1/2016 | Chalenko ............ G03B 17/566 359/818 |

* cited by examiner

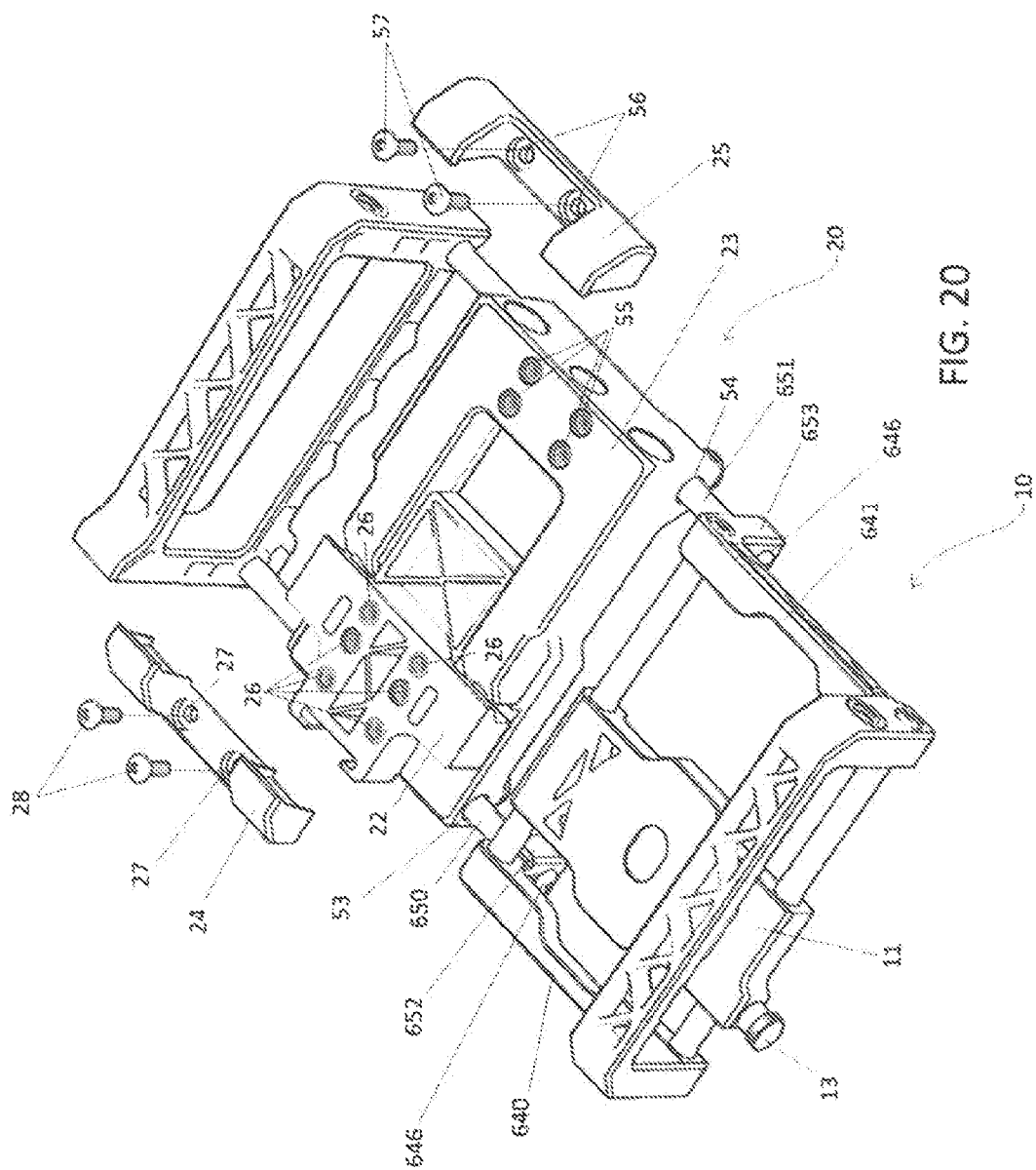

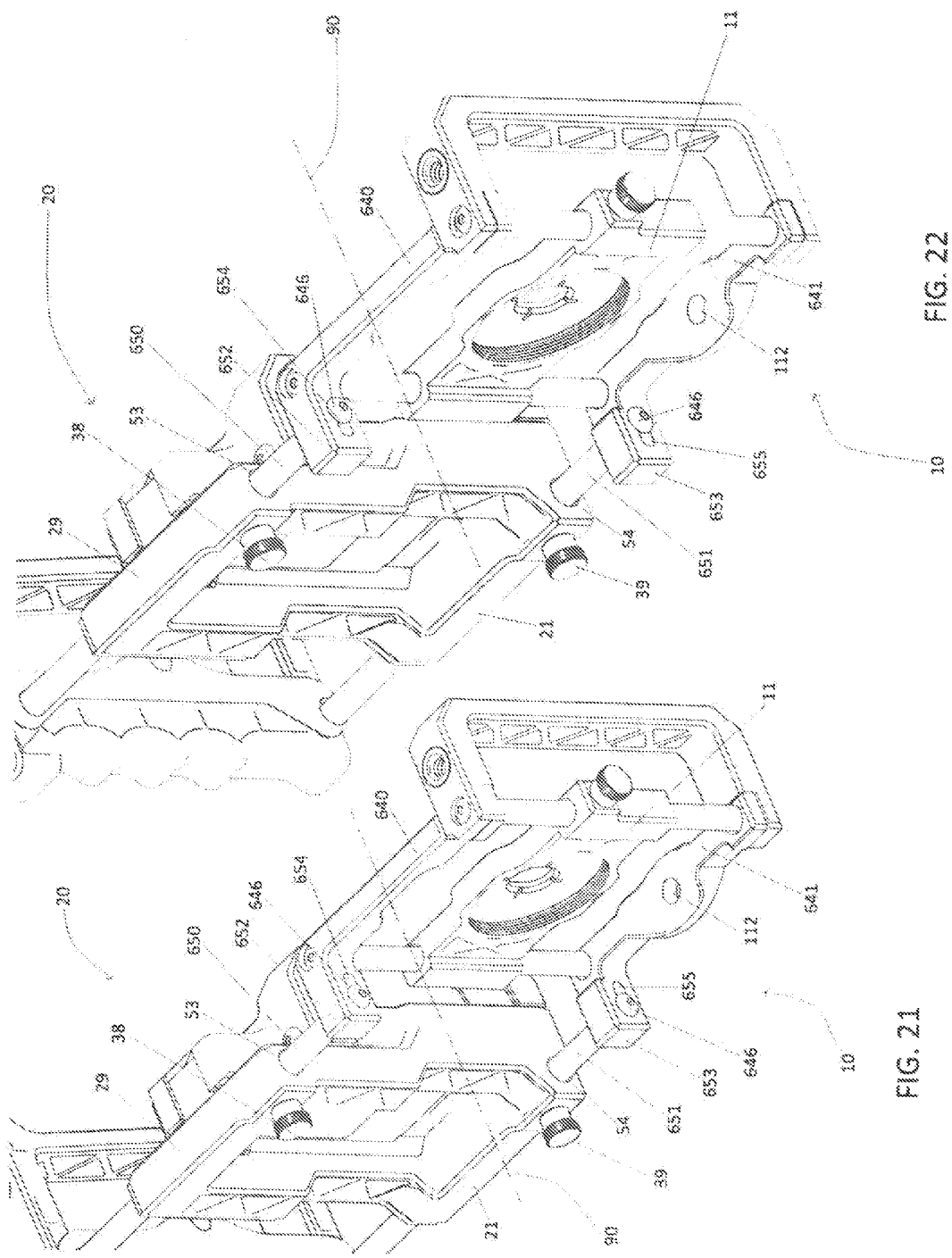

UNIVERSAL ADJUSTABLE LENS ADAPTER

CROSS-REFERENCE TO RELATED APPLICATION(S)

This application claims priority to U.S. Provisional Patent application Ser. No. 61/858,034, filed Jul. 24, 2013, U.S. Non-provisional patent application Ser. No. 14/332,077, filed Jul. 15, 2014, now U.S. Pat. No. 9,195,120, issued Nov. 24, 2015, and U.S. Non-provisional patent application Ser. No. 14/844,265, filed Sep. 3, 2015, to the extent allowed by law.

TECHNICAL FIELD

This disclosure relates to smartphone accessories. More specifically, the present disclosure relates to a universal adjustable lens adapter and rig system for smartphones. The present disclosure relates to a universal adjustable lens adapter and rig system for smartphones that is modular and allows a user to mount a variety of accessories to a smartphone.

BACKGROUND

The advancement of mobile electronic technology has led to a surge in the popularity of smartphones. Smartphones are favored for their high level of versatility and functionality. Modern smartphones allow users to place calls, send text messages, play games, and access the Internet. Another common use for smartphones is to capture and share media such as photos and videos. Smartphones typically feature one or more cameras that are capable of capturing both still images and videos. However, the majority of smartphones feature a rectangular design, and are relatively thin. This can create difficulties when attempting to hold a smartphone steady during image and video capture. Additionally, despite the advanced capabilities, much of the camera technology of smartphones is limited with regards to the ability to utilize the cameras in conjunction with existing lens and camera accessories. As a result, there is generally no way to improve and enhance captured media through add-on lenses such as macro lenses, fisheye lenses, and wide angle lenses, as well as accessories such as tripods, stabilizers, microphones, and flash units. The present disclosure seeks to address the aforementioned issues relating to smartphone-integrated camera technology as well as accessories that are commonly used in multimedia capture.

The present disclosure is a universal adjustable lens adapter and rig system that is adaptable as to accommodate all smartphones. In the preferred embodiment, the present disclosure comprises a lens mount assembly, a handle assembly, and a clamp mount assembly. The clamp mount assembly is adjustable and spring loaded to secure a smartphone in place within the universal adjustable lens adapter and rig system. The clamp mount assembly includes a cold shoe mount that allows a user to mount accessories, such as flash units, to the universal adjustable lens adapter and rig system. The lens mount assembly features a standardized threaded lens mount ring for accommodating add-on lenses. The lens mount assembly is adjustable to align the smartphone camera with the lens mount ring. The handle assembly features a first handle and a second handle that allow a user to hold the universal adjustable lens adapter and rig system with two hands for a high degree of stability. In addition to the previously mentioned accessory mounting points, the universal adjustable lens adapter and rig system features a plurality of additional standardized threaded mount inserts that accommodate accessories such as tripods and other mounting accessories. Furthermore, the components of the present disclosure are designed in a manner such that the universal adjustable lens adapter and rig system may rest on a flat surface in both a horizontal and vertical orientation. The components of the lens adapter and rig system are lightweight in order to facilitate ease of use and user comfort.

The object of the present disclosure is to provide a means to utilize multiple existing lens and camera accessories with a smartphone or tablet. It is a further object of the present disclosure to be modular, universally adaptable to all smartphone or tablet devices and camera accessories, and can be used with additional components.

SUMMARY

Disclosed herein are aspects of a universal adjustable lens adapter and rig system for smartphones and other electronic devices.

One system includes a lens mount assembly that comprises a lens mount base adjacently connected to a lens mount ring, a clamp mount assembly, and a handle assembly that comprises a clamp mount support, a lens mount support, a first handle, and a second handle. The lens mount base is slidably connected to the lens mount support along a first slide axis and the clamp mount assembly is slidably attached to the clamp mount support along a second slide axis, the first slide axis and the second slide axis aligned perpendicular to each other. The clamp mount support is adjacently and removably connected to the lens mount support. The first handle is adjacently and removably attached to the clamp mount support opposite the lens mount support. The second handle is adjacently attached to the lens mount support opposite the clamp mount support.

These and other aspects of the present disclosure are disclosed in the following detailed description of the embodiments, the appended claims and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 20 is an exploded perspective view of the second embodiment of the present disclosure, showing a removable and adjustable first clamp grip and second clamp grip.

FIG. 21 is a detail perspective view of the lens mount assembly of the second embodiment of the present disclosure, showing a threaded second arm aperture and the lens mount assembly in a first position.

FIG. 22 is a detail perspective view of the lens mount assembly of the second embodiment of the present disclosure, showing the threaded second arm aperture and the lens mount assembly in a second position.

DETAILED DESCRIPTION

All illustrations of the drawings are for the purpose of describing selected versions of the present disclosure and are not intended to limit the scope of the present disclosure.

The present disclosure is a universal adjustable lens adapter and rig system for smartphones, or similar electronic devices such as tablets, that is modular in nature. The present disclosure allows a user to utilize existing lens and camera accessories in conjunction with a smartphone device. In reference to FIG. 1, the present disclosure comprises a lens mount assembly 10, a clamp mount assembly 20, and a handle assembly 60. The lens mount assembly 10 provides a means for securing and aligning a camera lens, while the clamp mount assembly 20 provides a means for securing and aligning the smartphone. The handle assembly 60 supports both the lens mount assembly 10 and the clamp mount assembly 20.

Figure 1:
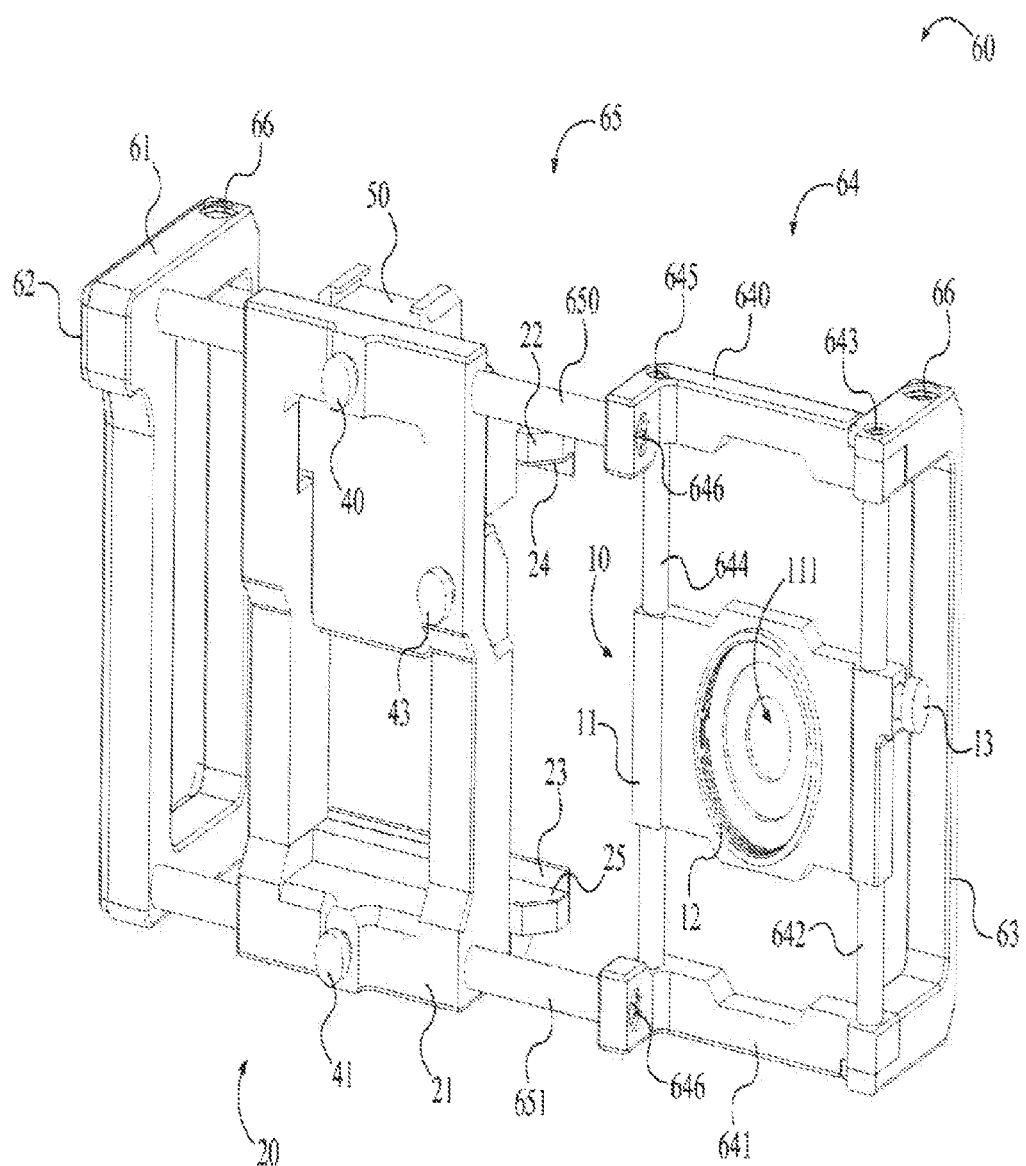
FIG. 1 is a perspective view of the present disclosure.

In further reference to FIG. 1, the handle assembly 60 comprises a clamp mount support 65, a lens mount support 64, a first handle 61, and a second handle 63. The clamp mount support 65 is adjacently connected to the lens mount support 64, while the first handle 61 is adjacently attached to the clamp mount support 65 opposite the lens mount support 64 and the second handle 63 is adjacently attached to the lens mount support 64 opposite the clamp mount support 65. Together, the clamp mount support 65, the lens mount support 64, the first handle 61, and the second handle 63 form a frame to support the lens mount assembly 10 and the clamp mount assembly 20. The first handle 61 and the second handle 63 provide a means for the user to readily grasp and maneuver the present disclosure when a smartphone is positioned within the clamp mount assembly 20 in order to take pictures.

Figure 2:
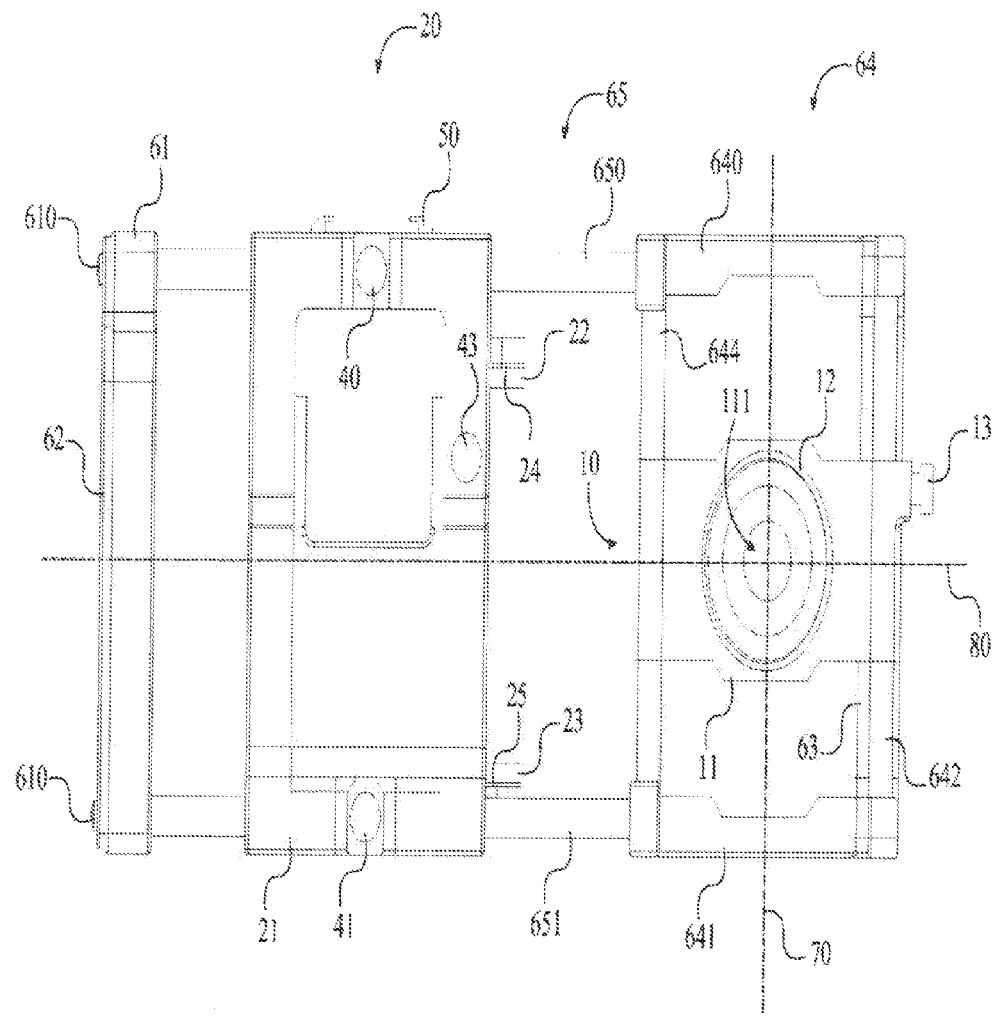
FIG. 2 is a front elevation view of the present disclosure.
Figure 3:
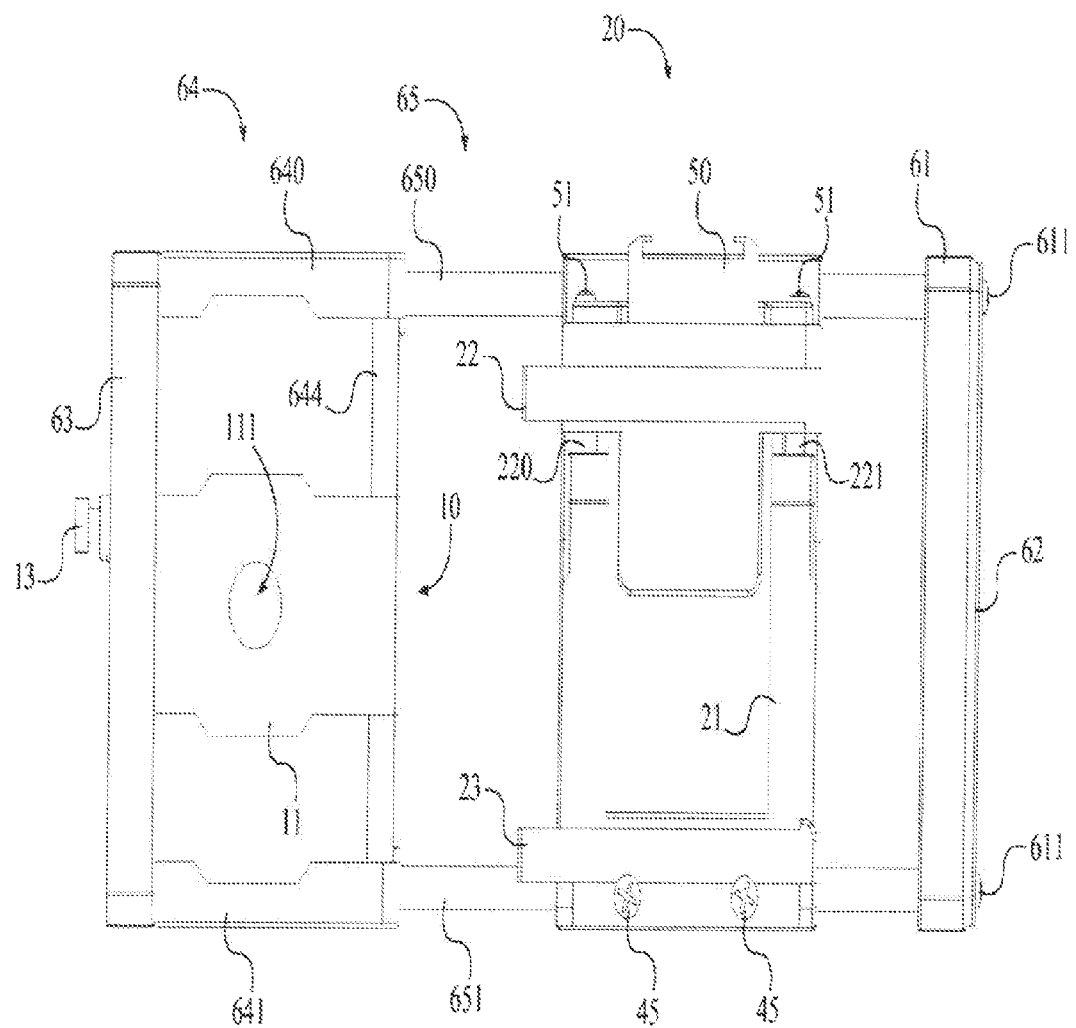
FIG. 3 is a rear elevation view of the present disclosure.
Figure 4:
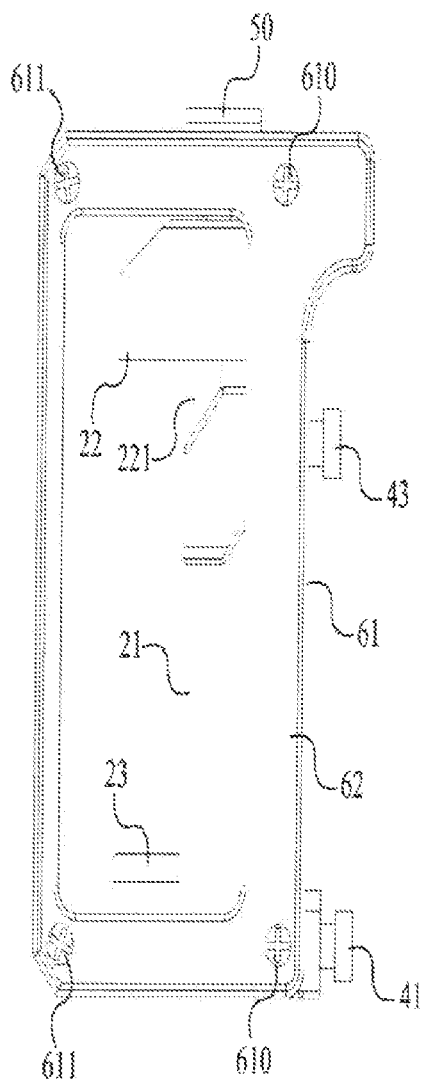
FIG. 4 is a left side elevation view of the present disclosure.

In reference to FIG. 2-3, the lens mount support 64 comprises a first lens mount standoff shaft 642, a second lens mount standoff shaft 644, a first arm 640, and a second arm 641. The first arm 640 and the second arm 641 are adjacently attached to the second handle 63, wherein the first arm 640 and the second arm 641 are positioned opposite each other along the second handle 63. The first lens mount standoff shaft 642 and the second lens mount standoff shaft 644 are adjacently connected to the first arm 640 and the second arm 641; the first lens mount standoff shaft 642 and the second lens mount standoff shaft 644 being positioned in between the first arm 640 and the second arm 641. The first lens mount standoff shaft 642 is positioned adjacent to the second handle 63, while the second lens mount standoff shaft 644 is positioned adjacent to the clamp mount support 65.

Figure 15:
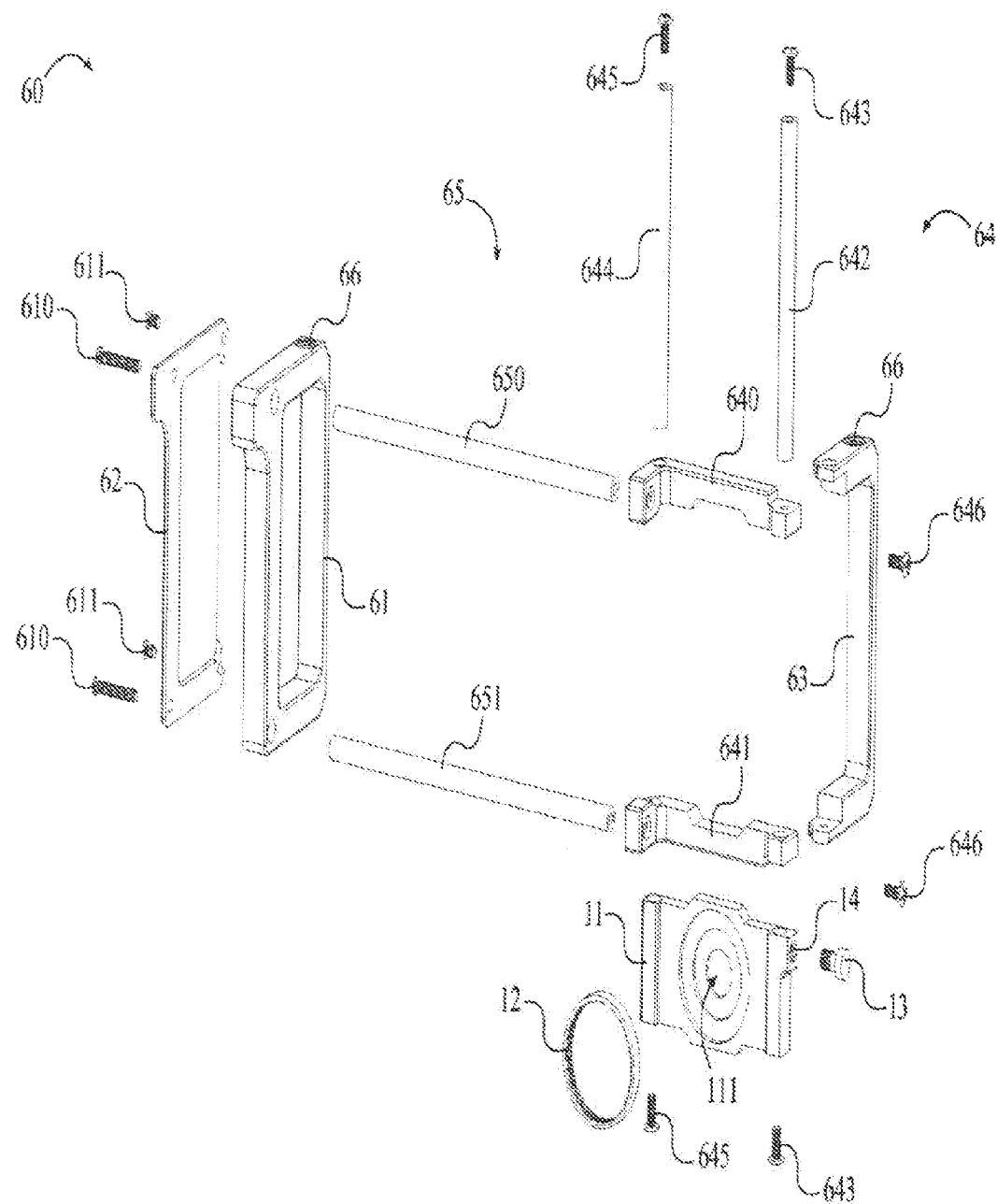
FIG. 15 is an exploded view of the handle assembly and the lens mount assembly.

In reference to FIG. 1 and FIG. 15, in the preferred embodiment of the present disclosure, the first lens mount standoff shaft 642 is connected to the first arm 640 and the second arm 641 by a first pair of lens mount screws 643 and the second lens mount standoff is connected to the first arm 640 and the second arm 641 by a second pair of lens mount screws 645. Each of the first pair of lens mount screws 643 traverses through the second handle 63 and either the first arm 640 or the second arm 641 and then into opposite ends of the first lens mount standoff shaft 642. Each of the second pair of lens mount screws 645 traverses through either the first arm 640 or the second arm 641 and into opposite ends of the second lens mount standoff shaft 644.

In reference to FIG. 2, the lens mount assembly 10 comprises a lens mount base 11, a lens mount ring 12, and a lens mount thumb screw 13. The lens mount base 11 is slidably connected to the lens mount support 64 along a first slide axis 70. More specifically, the lens mount base 11 is slidably connected to the first lens mount standoff shaft 642 and the second lens mount standoff shaft 644, wherein the first lens mount standoff shaft 642 and the second lens mount standoff shaft 644 traverse through the lens mount base 11. The lens mount thumb screw 13 is positioned into the lens mount base 11 and is positioned adjacent to either the first lens mount standoff shaft 642 or the second lens mount standoff shaft 644. In this way, the lens mount thumb screw 13 can be made to engage either the first lens mount standoff shaft 642 or the second lens mount standoff shaft 644, such that the lens mount base 11 is locked in place along the first lens mount standoff shaft 642 and the second lens mount standoff shaft 644.

In reference to FIG. 1 and FIG. 15, in the preferred embodiment of the present disclosure, a threaded lens mount insert 14 is positioned through the lens mount base 11 adjacent to either the first lens mount standoff shaft 642 or the second lens mount standoff shaft 644. The lens mount thumb screw 13 is then threaded into the threaded lens mount insert 14, wherein the lens mount thumb screw 13 can be made to engage either the first lens mount standoff shaft 642 or the second lens mount standoff shaft 644. The threaded lens mount insert 14 reinforces the section of the lens mount base 11 into which the lens mount thumb screw 13 traverses and is ideally constructed from metal, however, any other mater may also be used.

Figure 10:
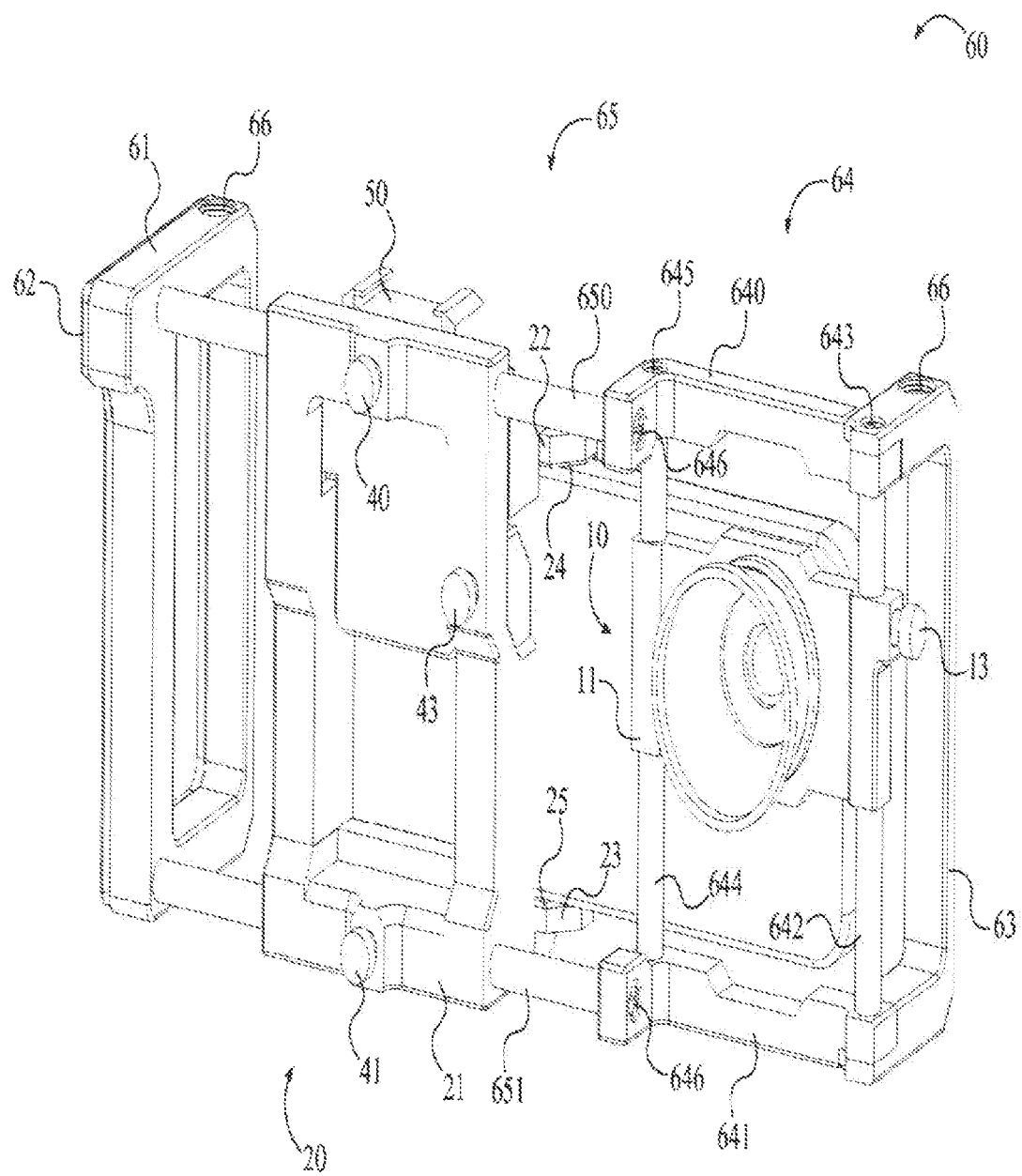
FIG. 10 is a perspective view thereof.

The lens mount ring 12 is adjacently connected to the lens mount base 11 and provides a means for securing a camera lens to the lens mount assembly 10. In the preferred embodiment of the present disclosure, the lens mount ring 12 has internal threading in order to secure the desired camera lens in place, however, it is possible for the lens mount ring 12 to provide other means of attachment, such as a snap fit. The lens mount ring 12 is positioned around an aperture 111 in the lens mount base 11, wherein the aperture 111 is aligned with the camera lens of the smartphone, as shown in FIG. 10, by positioning the lens mount base 11 along the first lens mount standoff shaft 642 and the second lens mount standoff shaft 644. In this way, the desired camera lens or additional attachment is aligned with the camera lens of the smartphone.

In reference to FIG. 1, the clamp mount support 65 comprises a first handle standoff shaft 650 and a second handle standoff shaft 651. The first handle standoff shaft 650 and the second handle 63 shaft are adjacently attached to the first handle 61, wherein the first handle standoff shaft 650 and the second handle standoff shaft 651 are positioned opposite each other along the first handle 61. The first arm 640 is adjacently connected to the first handle standoff shaft 650 opposite the first handle 61, and the second arm 641 is adjacently connected to the second handle standoff shaft 651 opposite the first handle 61. The handle assembly 60 further comprises a handle skin 62 that is attached to the first handle 61 opposite the first handle standoff shaft 650 and the second handle standoff shaft 651. The handle skin 62 provides a unique, decorative face plate for the first handle 61 that can be customized for each user.

In reference to FIG. 1 and FIG. 15, in the preferred embodiment of the present disclosure, the first arm 640 and the second arm 641 are connected to the first handle standoff shaft 650 and the second handle standoff shaft 651 respectively, by a third pair of lens mount screws 646. Each of the third pair of lens mount screws 646 traverses either through the first arm 640 and into the first handle standoff shaft 650 or traverses through the second arm 641 and into the second handle standoff shaft 651. Additionally, in the preferred embodiment of the present disclosure, the first handle standoff shaft 650 and the second handle standoff shaft 651 are attached to the first handle 61 by a first pair of handle screws 610. Each of the first pair of handle screws 610 traverses through the handle skin 62, through the first handle 61, and into either the first handle standoff shaft 650 or the second handle standoff shaft 651. Additionally, a second pair of handle screws 611, adjacent to the first pair of handle screws 610, traverses through the handle skin 62 into the first handle 61 in order to further secure the handle skin 62.

Figure 14:
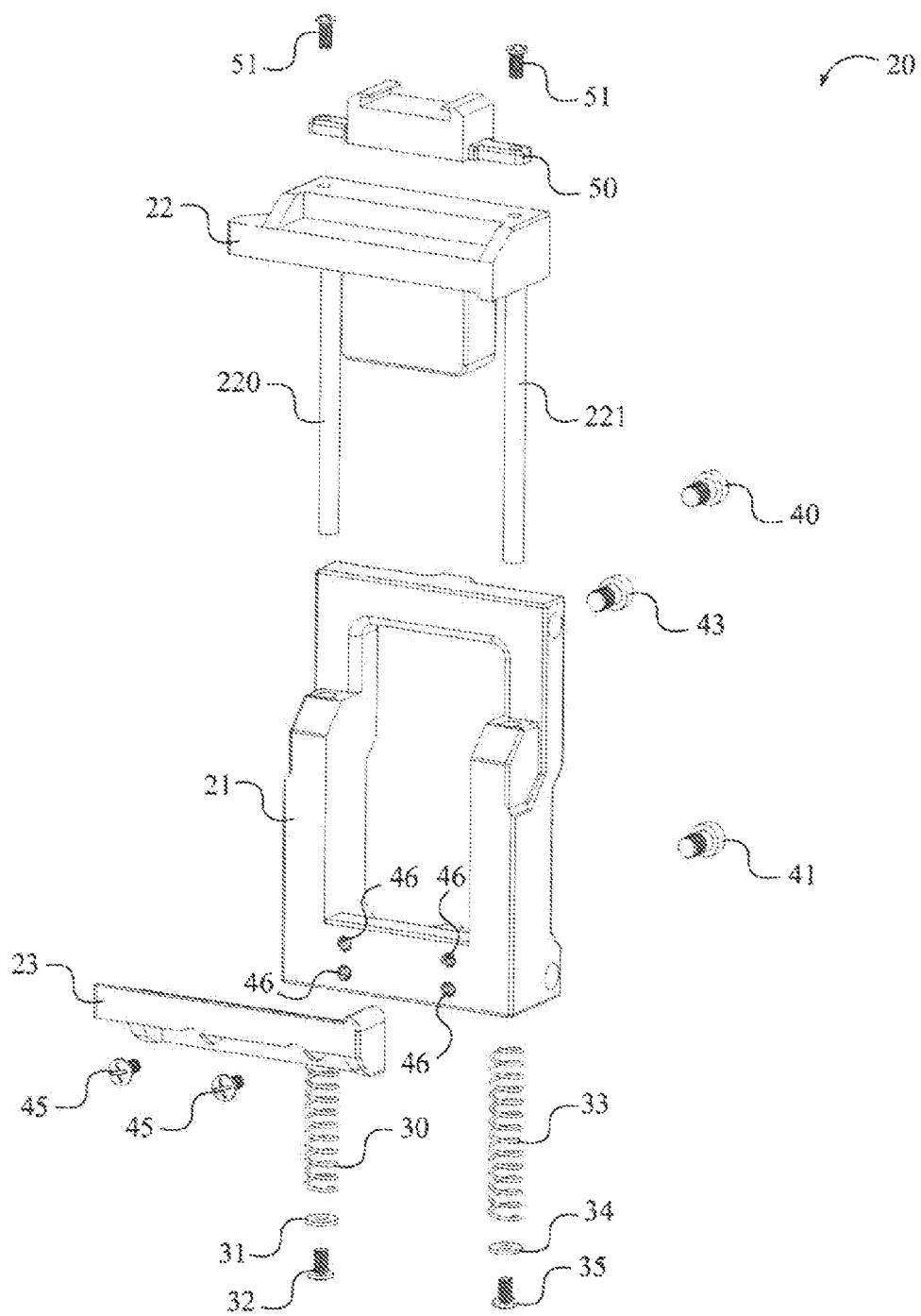
FIG. 14 is an exploded view of the clamp mount assembly.

In reference to FIG. 14, the clamp mount assembly 20 comprises a clamp base 21, a first clamp 22, a second clamp 23, a first clamp grip 24, a second clamp grip 25, a first compression spring 30, a second compression spring 33, a first thumb screw 40, a second thumb screw 41, and a clamp mount thumb screw 43. In reference to FIG. 2, the clamp base 21 is slidably attached to the clamp mount support 65 along a second slide axis 80. More specifically, the clamp base 21 is slidably attached to the first handle standoff shaft 650 and the second handle standoff shaft 651, wherein the first handle standoff shaft 650 and the second handle standoff shaft 651 traverse through the clamp base 21. The second slide axis 80 is aligned perpendicular to the first slide axis 70, such that the clamp mount assembly 20 may slide horizontally and the lens mount assembly 10 may slide vertically when the present disclosure is positioned as shown in FIG. 2.

In reference to FIG. 1, the first thumb screw 40 and the second thumb screw 41 are positioned into the clamp base 21. The first thumb screw 40 is positioned adjacent to the first handle standoff shaft 650 and the second thumb screw 41 is positioned adjacent to the second handle standoff shaft 651. In this way, the first thumb screw 40 and the second thumb screw 41 can be made to engage the first handle standoff shaft 650 and the second handle standoff shaft 651 respectively, such that the clamp base 21 is locked in place along the first handle standoff shaft 650 and the second handle standoff shaft 651.

Figure 13:
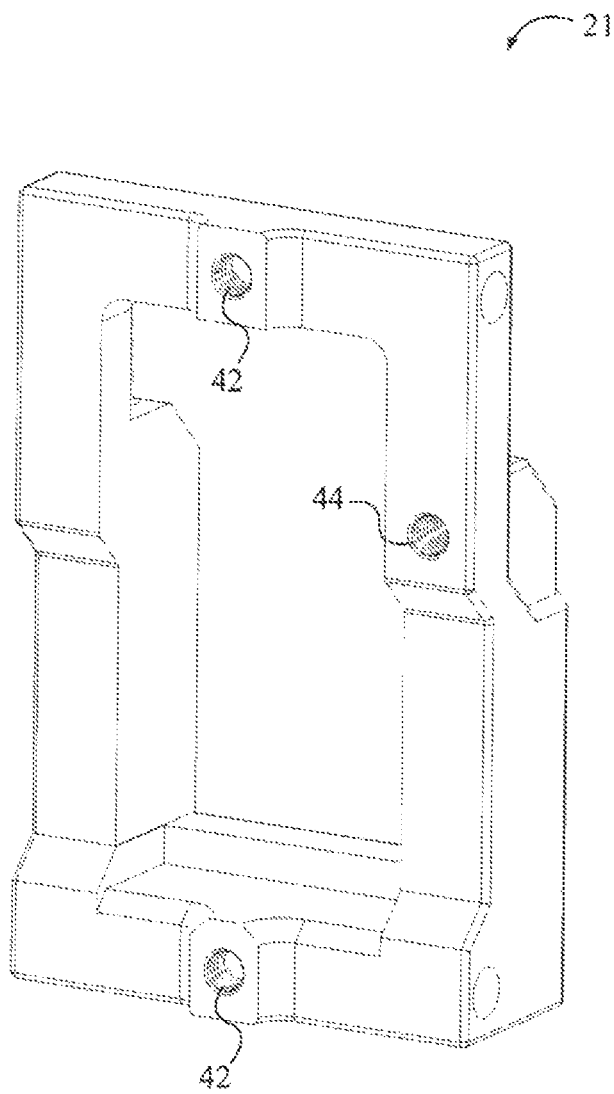
FIG. 13 is a perspective view of the clamp base, wherein the first thumb screw, second thumb screw, and the clamp mount thumb screw are removed.

In reference to FIG. 13, in the preferred embodiment of the present disclosure, a pair of threaded inserts 42 is positioned into the clamp base 21 adjacent to the first handle standoff shaft 650 and the second handle standoff shaft 651. The first thumb screw 40 and the second thumb screw 41 are then threaded into the pair of threaded inserts 42, wherein the first thumb screw 40 and the second thumb screw 41 can be made to engage the first handle standoff shaft 650 and the second handle standoff shaft 651 respectively. The pair of threaded inserts 42 reinforces the section of the clamp base 21 into which the first thumb screw 40 and the second thumb screw 41 traverse and, ideally, each of the pair of threaded inserts 42 is constructed from metal; however, any other material may also be used.

Figure 8:
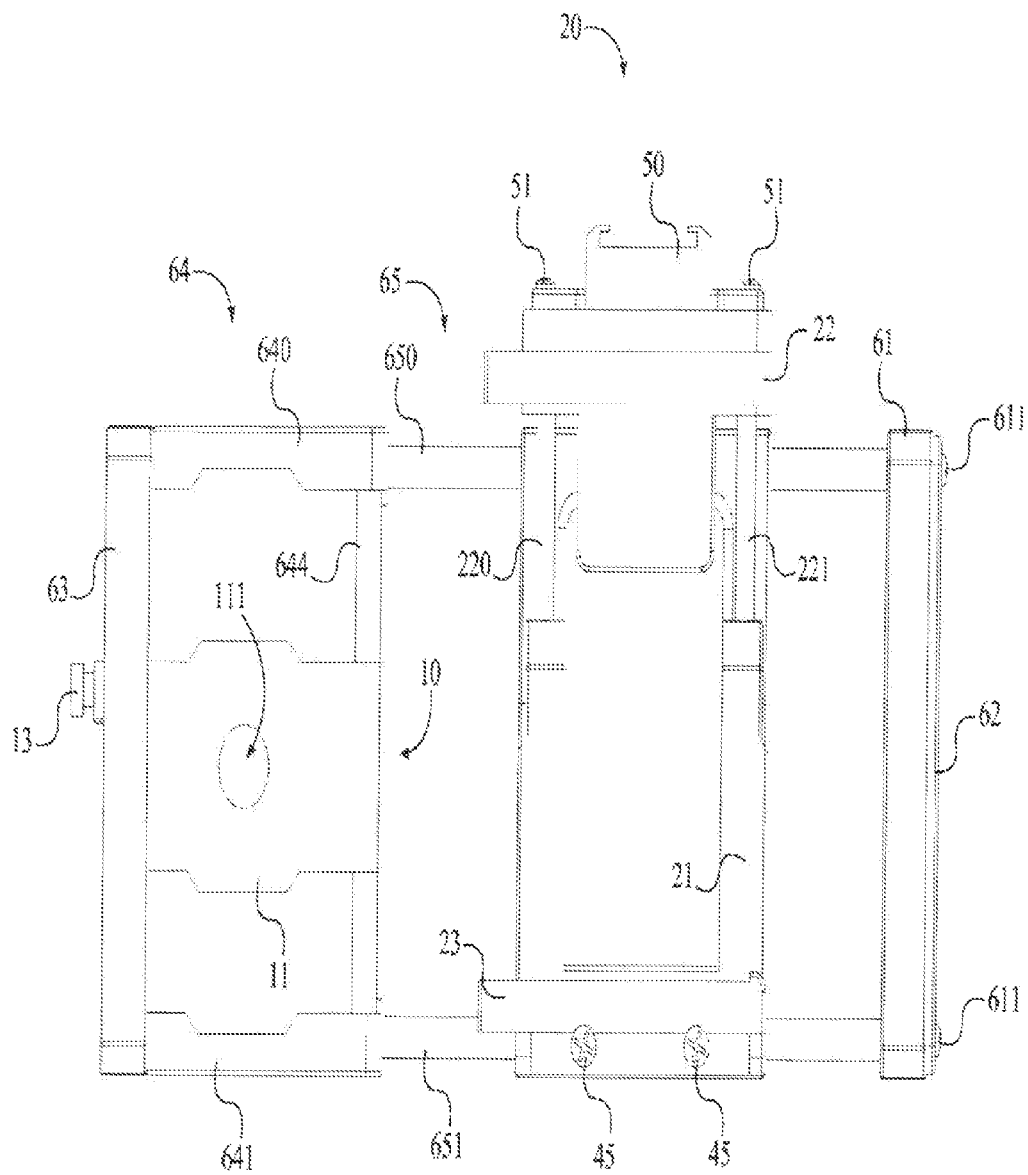
FIG. 8 is a rear elevation view of the present disclosure, wherein the clamp mount assembly is opened in order to receive an electronic device.

In reference to FIG. 3 and FIG. 8, the first clamp 22 is slidably connected to the clamp base 21 and comprises a first clamp mount standoff shaft 220 and a second clamp mount standoff shaft 221. The first clamp mount standoff shaft 220 and the second clamp mount standoff shaft 221 are positioned opposite each other along the first clamp 22. The first clamp mount standoff shaft 220 and the second clamp mount standoff shaft 221 are slidably connected to the clamp base 21, wherein the first clamp mount standoff shaft 220 and the second clamp mount standoff shaft 221 are positioned into the clamp base 21. The first compression spring 30 and the second compression spring 33 are positioned within the clamp base 21. The first compression spring 30 is positioned adjacent to the first clamp mount standoff shaft 220 and the second compression spring 33 is positioned adjacent to the second clamp mount standoff shaft 221.

Figure 11:
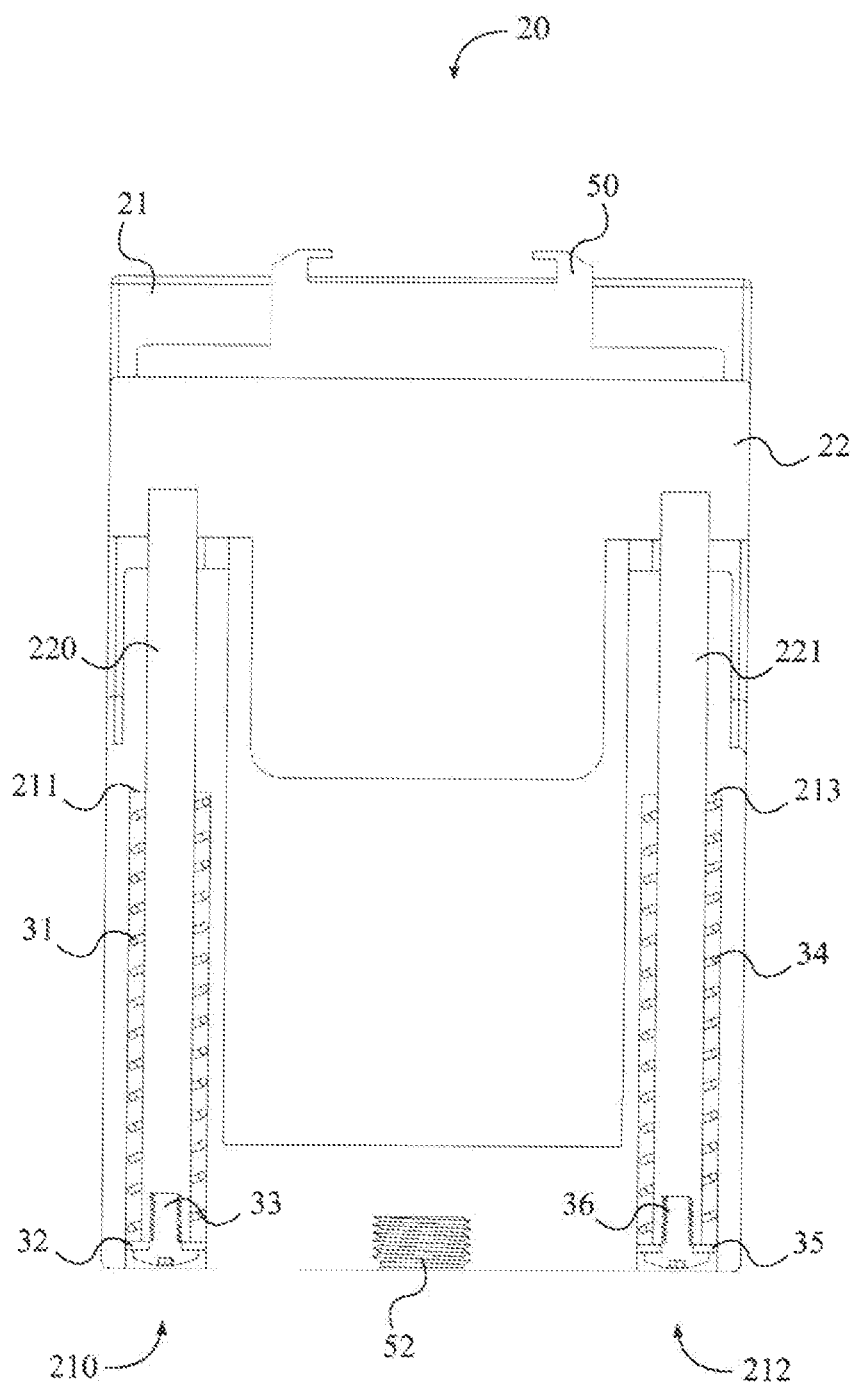
FIG. 11 is a rear sectional view of the clamp mount assembly, wherein the first compression spring and the second compression spring are decompressed.
Figure 12:
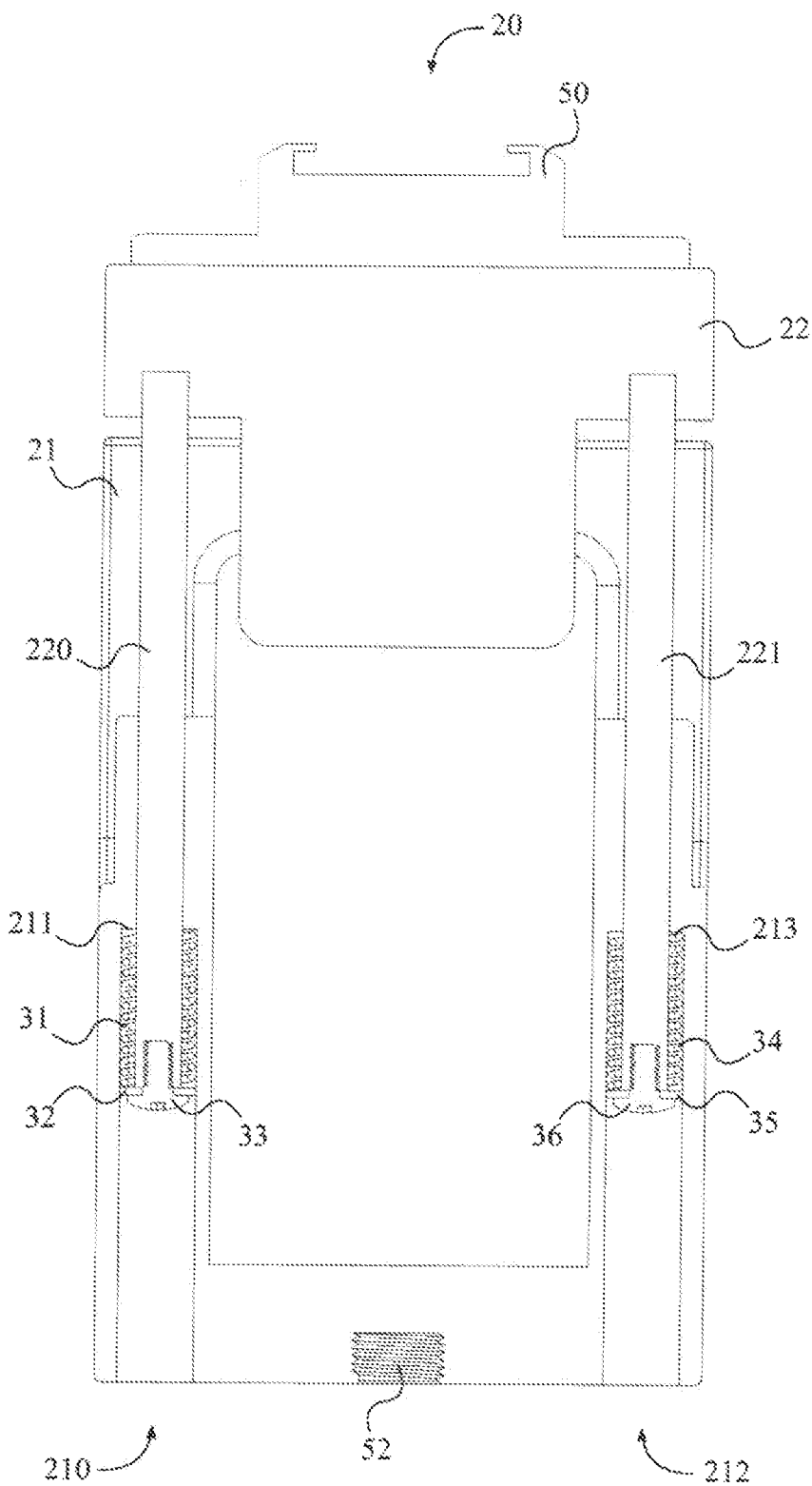
FIG. 12 is a rear sectional view of the clamp mount assembly, wherein the clamp mount assembly is open and both the first compression spring and the second compression spring are compressed.

In reference to FIG. 11-12, the first clamp mount standoff shaft 220 is mechanically coupled to the first compression spring 30 through a first washer 31 and a first screw 32. The first compression spring 30 is positioned into a first cavity 210 of the clamp base 21, wherein the first compression spring 30 rests on a first ledge 211. The first clamp mount standoff shaft 220 traverses through the first compression spring 30 and the first washer 31 is connected to the first clamp mount standoff shaft 220 by the first screw 32. The first washer 31 is positioned about the end of the first clamp mount standoff shaft 220, such that the first compression spring 30 is positioned in between the first washer 31 and the first ledge 211. In this way, when the first clamp 22 is pulled away from the second clamp 23, the first compression spring 30 is compressed, wherein when the first clamp 22 is released the spring force of the first compression spring 30 acts to restore the original position of the first clamp 22.

In further reference to FIG. 11-12, the second clamp mount standoff shaft 221 is mechanically coupled to the second compression spring 33 through a second washer 34 and a second screw 35. The second compression spring 33 is positioned into a second cavity 212 of the clamp base 21, wherein the second compression spring 33 rests on a second ledge 213. The second clamp mount standoff shaft 221 traverses through the second compression spring 33 and the second washer 34 is connected to the second clamp mount standoff shaft 221 by the second screw 35. The second washer 34 is positioned about the end of the second clamp mount standoff shaft 221, such that the second compression spring 33 is positioned in between the second washer 34 and the second ledge 213. In this way, when the first clamp 22 is pulled away from the second clamp 23, the second compression spring 33 is compressed, wherein when the first clamp 22 is released the spring force of the second compression spring 33 acts to restore the original position of the first clamp 22.

In reference to FIG. 1, the clamp mount thumb screw 43 is positioned into the clamp base 21 and is positioned adjacent to either the first clamp mount standoff shaft 220 or the second clamp mount standoff shaft 221. In this way, the clamp mount thumb screw 43 can be made to engage either the first clamp mount standoff shaft 220 or the second clamp mount standoff shaft 221, such that the first clamp 22 is locked in place around the clamp base 21. While the first compression spring 30 and the second compression spring 33 act to provide a clamping force between the first clamp 22 and the second clamp 23, the clamp mount thumb screw 43 ensures that the first clamp 22 cannot be inadvertently pulled away from the second clamp 23.

In reference to FIG. 13, in the preferred embodiment of the present disclosure, a threaded clamp mount insert 44 is positioned into the clamp base 21 adjacent to either the first clamp mount standoff shaft 220 or the second clamp mount standoff shaft 221. The clamp mount thumb screw 43 is then threaded into the threaded clamp mount insert 44, wherein the clamp mount thumb screw 43 can be made to engage either the first clamp mount standoff shaft 220 or the second clamp mount standoff shaft 221. The threaded clamp mount insert 44 reinforces the section of the clamp base 21 into which the clamp mount thumb screw 43 traverses and is ideally constructed from metal, however, any other material may also be used.

In reference to FIG. 3, the second clamp 23 is adjacently attached to the clamp base 21, wherein the first clamp 22 and the second clamp 23 are positioned opposite each other along the clamp base 21. In the preferred embodiment of the present disclosure, a plurality of threaded inserts 46 are positioned into the clamp base 21, as shown in FIG. 14, wherein the second clamp 23 is attached to the clamp base 21 through a pair of clamp screws 45. The pair of clamp screws 45 is positioned through the second clamp 23 and into the plurality of threaded inserts 46. In this way, the position of the second clamp 23 along the clamp base 21 can be adjusted. The plurality of threaded inserts 46 reinforces the section of the clamp base 21 into which the pair of clamp screws 45 traverses and, ideally, each of the plurality of threaded inserts 46 is constructed from metal; however, any other material may also be used.

Figure 5:
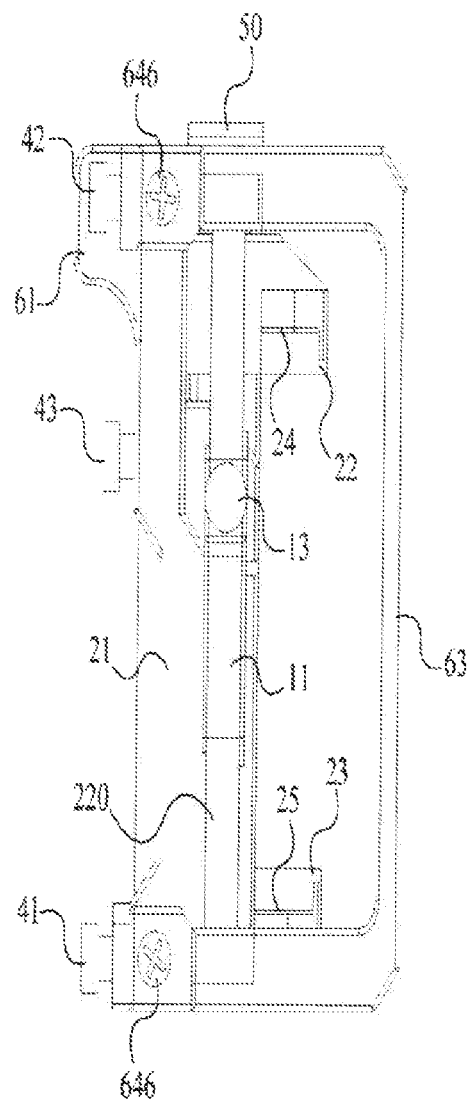
FIG. 5 is a right side elevation view of the present disclosure.

In reference to FIG. 5, the first clamp grip 24 is adjacently connected to the first clamp 22 and the second clamp grip 25 is adjacently connected to the second clamp 23. The first clamp grip 24 and the second clamp grip 25 are positioned along the first clamp 22 and the second clamp 23 respectively, such that the first clamp grip 24 and the second clamp grip 25 make contact with the smartphone when the smartphone is positioned within the clamp mount assembly 20. In the preferred embodiment of the present disclosure, the first clamp grip 24 and the second clamp grip 25 are constructed from rubber in order to provide sufficient grip (without damaging the smartphone) to hold the smartphone in place, such that the smartphone does not inadvertently fall out of the clamp mount assembly 20. However, it is also possible for the first clamp grip 24 and the second clamp grip 25 to be constructed of other materials providing the same function.

In reference to FIG. 3, the clamp mount assembly 20 further comprises a cold shoe mount 50. The cold shoe mount 50 is adjacently connected to the first clamp 22 opposite the clamp base 21. More specifically, the cold shoe mount 50 is connected to the first clamp 22 opposite the first clamp mount standoff shaft 220 and the second clamp mount standoff shaft 221. The cold shoe mount 50 allows the user to attach a camera flash or other camera accessories to the present disclosure in order to be used with the smartphone while taking pictures. In reference to FIG. 6, in the preferred embodiment of the present disclosure, the cold shoe mount 50 is secured to the first clamp 22 by a pair of shoe mount screws 51, wherein each of the pair of shoe mount screws 51 traverses through the cold shoe mount 50 into the first clamp 22.

Figure 7:
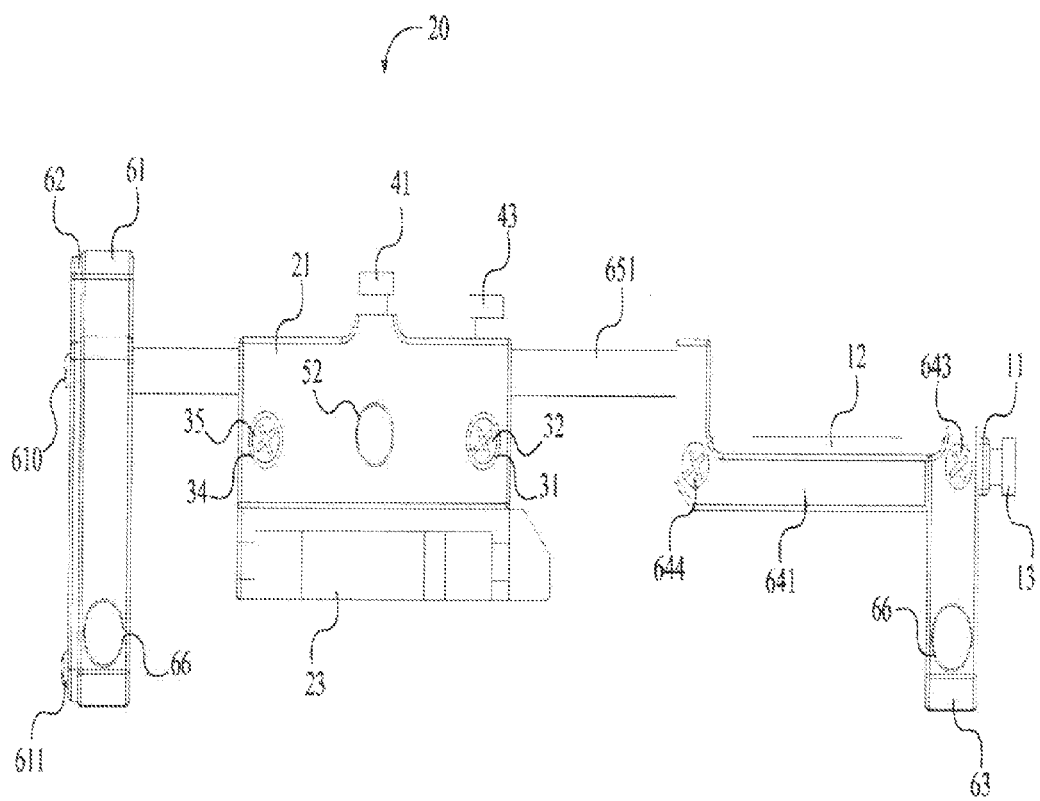
FIG. 7 is a bottom plan view of the present disclosure.

In reference to FIG. 7, the clamp mount assembly 20 also further comprises a threaded clamp base insert 52. The threaded clamp base insert 52 is positioned into the clamp base 21 and is positioned adjacent to the second clamp 23. The threaded clamp base insert 52 allows the present disclosure to be mounted to a camera tripod, or similar stand, such that the smartphone can be stabilized while taking pictures. The threaded clamp base insert 52 also allows for the attachment of other various camera accessories in addition to a tripod.

The threaded clamp base insert 52 also allows the clamp mount assembly 20 to be used without the lens mount assembly 10 or the handle assembly 60. The first handle 61 can be removed from the clamp mount support 65, wherein the clamp mount assembly 20 can be slid off of the first handle standoff shaft 650 and the second handle standoff shaft 651. The clamp mount assembly 20 can then be attached to a tripod, stabilizer, slider, etc. through the threaded clamp base insert 52, wherein the smartphone can be utilized without the addition of extra lens or accessories.

Figure 6:
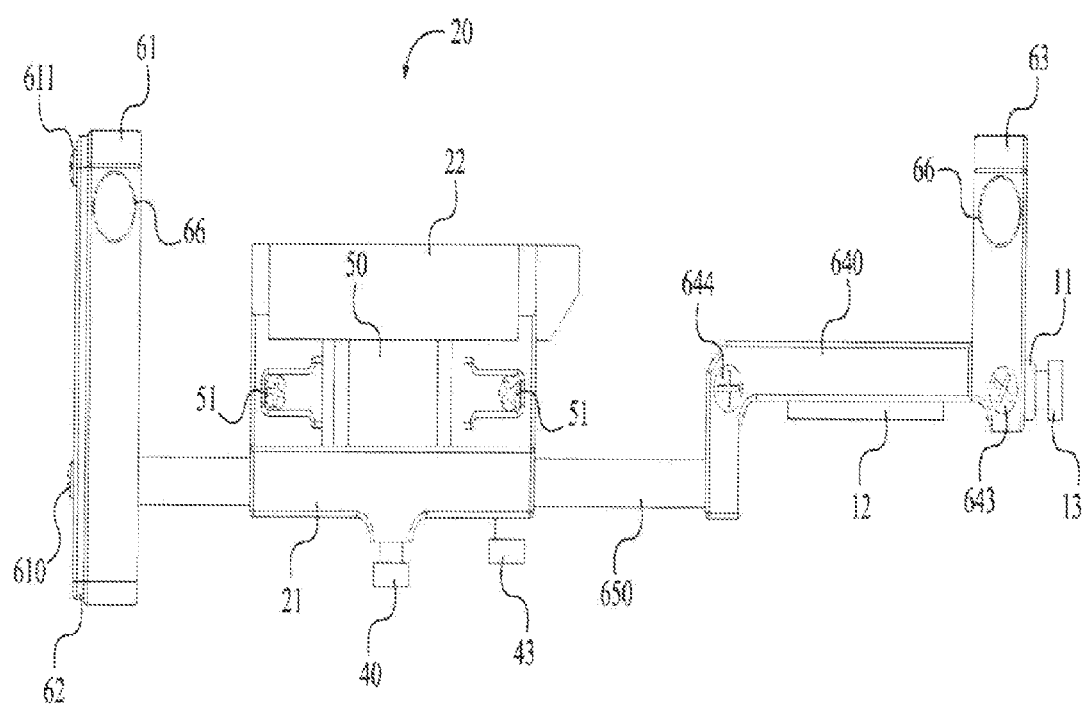
FIG. 6 is a top plan view of the present disclosure.

In reference to FIG. 6-7, the handle assembly 60 further comprises a plurality of threaded handle inserts. Each of the plurality of threaded handle inserts is positioned into either the first handle 61 or the second handle 63, as shown in FIG. 1. Similar to the threaded clamp mount insert 44, the plurality of threaded handle inserts allows for the attachment of various camera accessories to the present disclosure. In the preferred embodiment of the present disclosure, the plurality of threaded handle inserts comprises a first pair of handle inserts and a second pair of handle inserts. The first pair of handle inserts is positioned into the first handle 61, wherein each of the first pair of handle inserts is positioned opposite the other along the first handle 61. Similarly, the second pair of handle inserts is positioned into the second handle 63, wherein each of the second pair of handle inserts is positioned opposite the other along the second handle 63.

Figure 9:
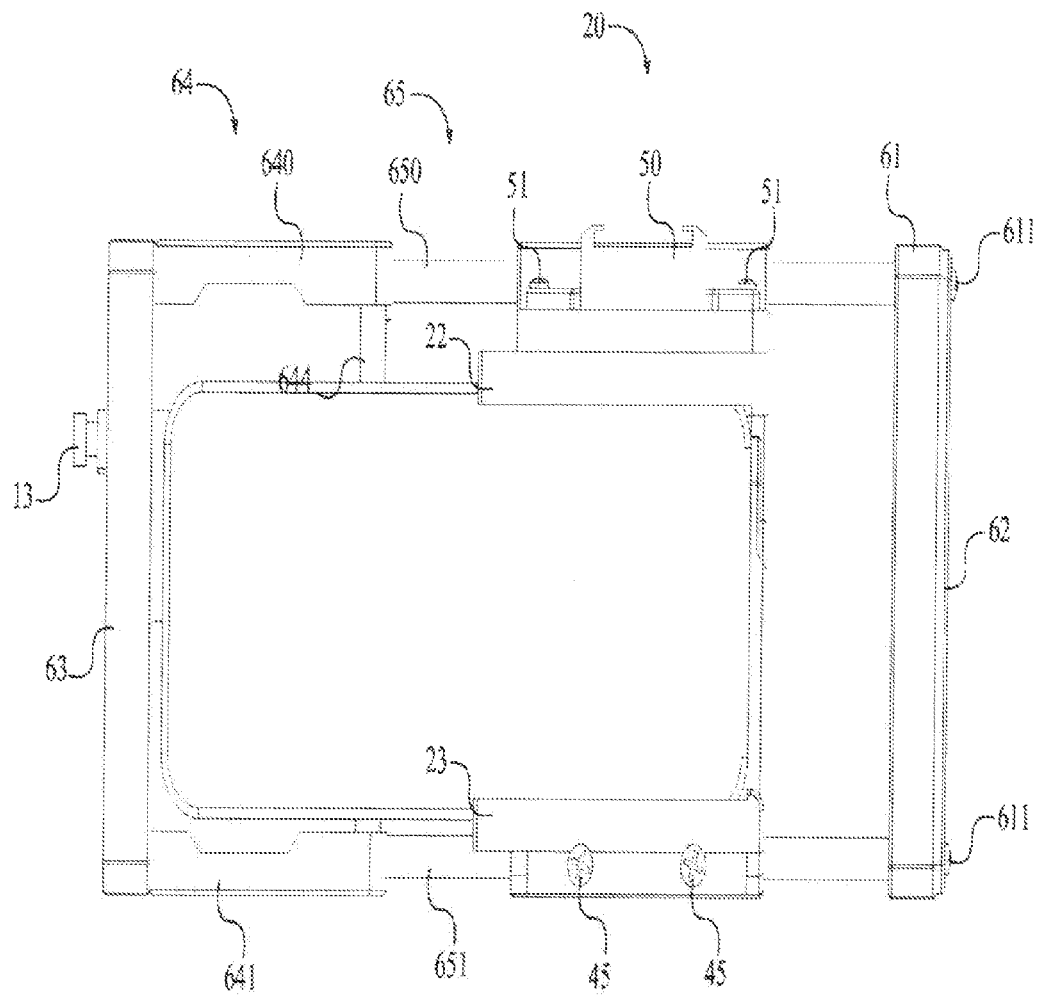
FIG. 9 is a rear elevation view of the present disclosure, wherein a smartphone is held in place by the clamp mount assembly as the camera lens is aligned with the lens mount assembly.

In order to use the present disclosure, a smartphone is first positioned in the clamp mount assembly 20 against the second clamp 23 while the first clamp 22 is pulled away from the clamp base 21, as shown in FIG. 8, wherein the first compression spring 30 and the second compression spring 33 are compressed within the clamp base 21. The first clamp 22 is then released, wherein the first compression spring 30 and the second compression spring 33 are allowed to decompress within the clamp base 21, thus pulling the first clamp 22 towards the clamp base 21 against the smartphone. In turn, the smartphone is clamped securely in between the first clamp 22 and the second clamp 23, as shown in FIG. 9. The clamp mount thumb screw 43 is then threaded through the clamp base 21 until the clamp mount thumb screw 43 engages either the first clamp mount standoff shaft 220 or the second clamp mount standoff shaft 221 in order to ensure that the first clamp 22 is locked in place and cannot be inadvertently pulled open.

Once the smartphone is positioned in between the first clamp 22 and the second clamp 23, the clamp base 21 is slid along the first handle standoff shaft 650 and the second handle standoff shaft 651 in order to horizontally align the camera lens with the aperture 111 of the lens mount base 11. When the camera lens has been aligned with the aperture 111, the first thumb screw 40 and the second thumb screw 41 are threaded through the clamp base 21 until the first thumb screw 40 engages the first handle standoff shaft 650 and the second thumb screw 41 engages the second handle standoff shaft 651. In turn, the clamp base 21 is locked in position along the first handle standoff shaft 650 and the second handle standoff shaft 651.

With the camera lens horizontally aligned with the aperture 111, the lens mount base 11 is then slid along the first lens mount standoff shaft 642 and the second lens mount standoff shaft 644 in order to vertically align the aperture 111 with the camera lens. Once the aperture 111 has been vertically aligned with the camera lens, the lens mount thumb screw 13 is threaded through the lens mount base 11 until the lens mount thumb screw 13 engages either the first lens mount standoff shaft 642 or the second lens mount standoff shaft 644. In turn, the lens mount base 11 is locked in position along the first lens mount standoff shaft 642 and the second lens mount standoff shaft 644. A lens or accessory, such as a macro lens, fish eye lens, or wide angle lens can then be attached to the lens mount ring 12, as shown in FIG. 10. Other camera accessories, such as a flash, tripod, stabilizers, or microphones, can then be attached to the present disclosure via the cold shoe mount 50, the threaded clamp base insert 52, or the plurality of threaded handle inserts.

In order to provide a more compact design, it is also possible for the present disclosure to be used without the first handle 61 and the second handle 63. Along with the removal of the first handle 61, the length of the first handle standoff shaft 650 and the second handle standoff shaft 651 may also be shortened. It may also be desirable to provide a stopper or pair of stoppers to attach to the first handle standoff shaft 650 and the second handle standoff shaft 651 to prevent the clamp mount assembly 20 from inadvertently sliding off. The compact design allows for the enhanced portability, maneuverability, and storage of the present disclosure.

Figure 16:
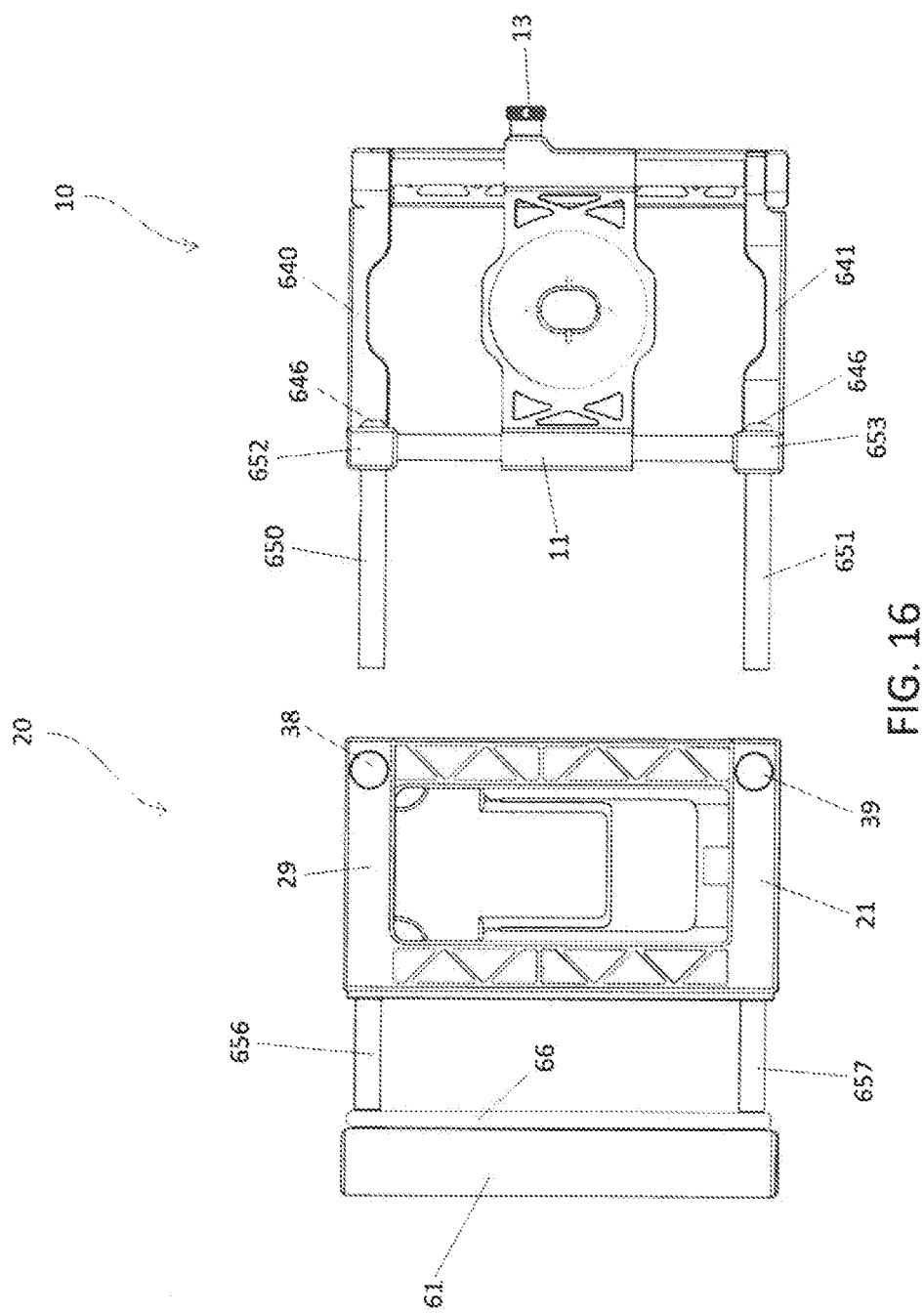
FIG. 16 is a front plan view of a second embodiment of the present disclosure, showing the lens mount assembly separated from the clamp mount assembly.

A second embodiment of the universal adjustable lens adapter and rig system for smartphones, or similar electronic devices such as tablets, that is modular in nature and can be used in combination with a variety of different accessories. In reference to FIG. 16, the present disclosure comprises the lens mount assembly 10, the clamp mount assembly 20, and the handle assembly 60. The handle assembly 60 comprises the clamp mount support 65, the lens mount support 64, the first handle 61, and the second handle 63.

The lens mount support 64 is removably and slidably connected to the clamp mount support 65, allowing the user to adjust the distance between the lens mount support 64 and the clamp mount support 65 along the second slide axis 80 (FIG. 2) in order to use the clamp mount assembly 20 separately or in combination with the lens mount assembly 10. The clamp mount support 65 comprises a top threaded aperture 36 that engages a third thumb screw 38 and a bottom threaded aperture 37 that engages a fourth thumb screw 39 to secure the clamp mount support 65 to the lens mount support 64. The lens mount support 64 can be separated from the clamp mount support 65 by removing the third thumb screw 38 from the top threaded aperture 36 and the fourth thumb screw 39 from the bottom threaded aperture 37, allowing the first handle standoff shaft 650 and the second handle standoff shaft 651 to slide out of the clamp mount support 65.

Figure 17:
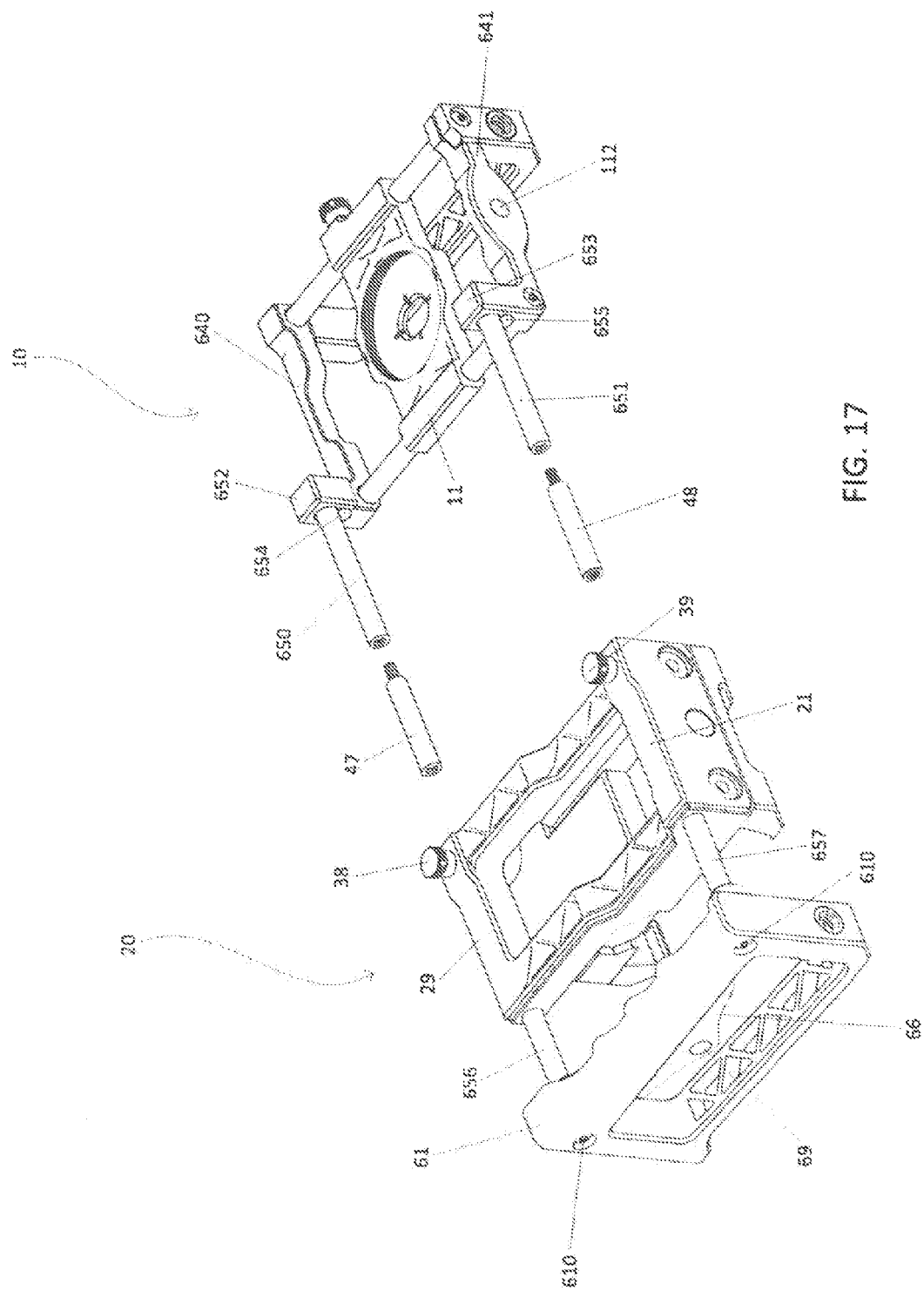
FIG. 17 is an exploded perspective view of the second embodiment of the present disclosure, showing a pair of extension standoff shafts.
Figure 18:
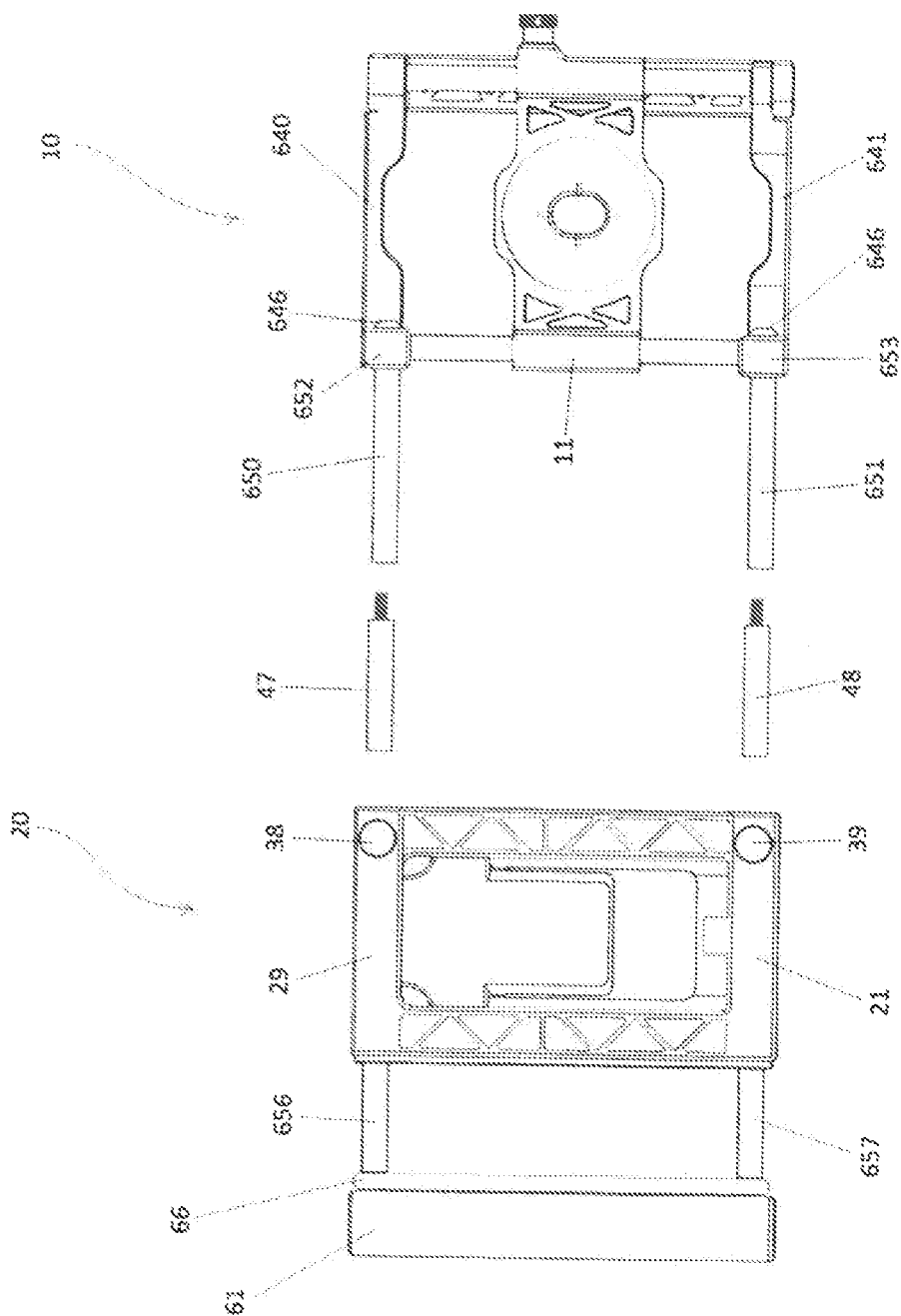
FIG. 18 is an exploded front plan view of the second embodiment of the present disclosure, showing a pair of extension standoff shafts.

In reference to FIGS. 17 and 18, a first handle extension standoff shaft 47 and a second handle extension standoff shaft 48 can be added to increase the distance between the lens mount support 64 and the clamp mount support 65. The first handle extension standoff shaft 47 engages the first handle standoff shaft 650 and the second handle extension standoff shaft 48 engages the second handle standoff shaft 651. The lens mount support 64 can be attached to the clamp mount support 65 once the first handle extension standoff shaft 47 and the second handle extension standoff shaft 48 have been attached. The clamp base 21 is slidably and removably attached to the first handle extension standoff shaft 47 and the second handle extension standoff shaft 48, wherein the first handle extension standoff shaft 47 and the second handle extension standoff shaft 48 traverse through top standoff shaft aperture 53 (FIGS. 20-22) and the bottom standoff shaft aperture 54 (FIGS. 20-22) in the clamp base 21. The first handle extension standoff shaft 47 and the second handle extension standoff shaft 48 can be moved to the desired location. The third thumb screw 38 then engages the top threaded aperture 36 (not shown) and the fourth thumb screw 39 then engages the bottom threaded aperture 37 (not shown), locking the first handle extension standoff shaft 47 and the second handle extension standoff shaft 48 at the desired location.

Figure 19:
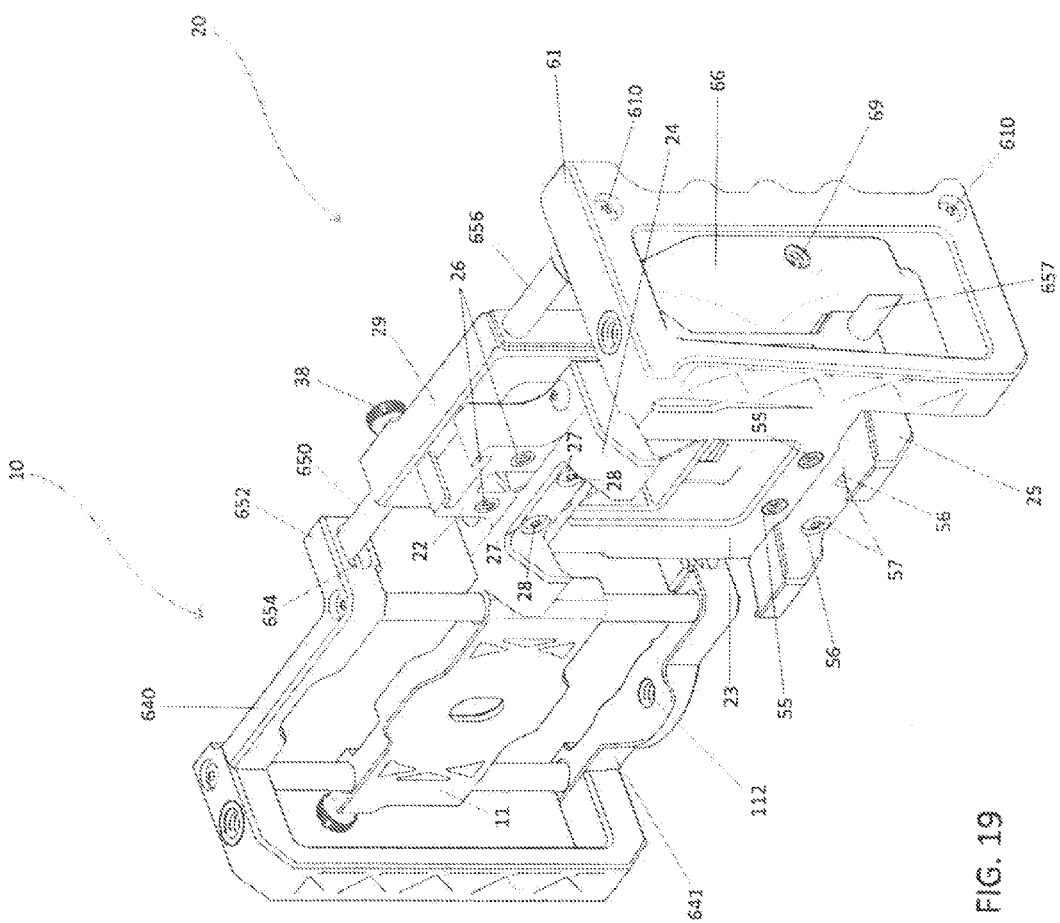
FIG. 19 is a rear perspective view of the second embodiment of the present disclosure.

In reference to FIGS. 19 and 20, the first clamp grip 24 of the clamp mount assembly 20 is removable from and adjustable relative to the first clamp 22. The first clamp 22 comprises at least two pairs of first clamp threaded apertures 26 and the first clamp grip 24 comprises a pair of first clamp grip threaded apertures 27. The first clamp grip 24 is vertically movable relative to the first clamp 22, along the first slide axis 70 (FIG. 2), between the positions of each of the at least two pairs of first clamp threaded apertures 26. A pair of first clamp grip screws 28 engage the pair of first clamp grip threaded apertures 27 on the first clamp grip 24 and one of the pairs of the first clamp threaded apertures 26 on the first clamp 22, allowing the user to lock the first clamp grip 24 in the desired position, thereby providing a wider range than the first compression spring 30 and the second compression spring 33 allow alone without an adjustable first clamp 22.

The second clamp grip 25 of the clamp mount assembly 20 is also removable from and adjustable relative to the second clamp 23. The second clamp 23 comprises at least two pairs of second clamp threaded apertures 55 and the second clamp grip 25 comprises a pair of second clamp grip threaded apertures 56. The second clamp grip 25 is vertically movable relative to the second clamp 23, along the first slide axis 70 (FIG. 2), between the positions of each of the at least two pairs of second clamp threaded apertures 55. A pair of second clamp grip screws 57 engage the pair of second clamp grip threaded apertures 56 on the second clamp grip 25 and one of the pairs of the second clamp threaded apertures 55 on the second clamp 23, allowing the user to lock the second clamp grip 25 in the desired position, thereby providing a wider range than the first compression spring 30 and the second compression spring 33 allow alone without an adjustable second clamp 23.

In reference to FIGS. 21 and 22, the lens mount support 64 is slidably moveable along a third slide axis 90 to accommodate lenses of different heights. Adjusting the lens mount support 64 along the third slide axis 90 allows the user to align the lens mount support 64 when using a smartphone, or similar electronic device, having a protruded camera module that is not flat with the smartphone's surface. The first arm 640 comprises a first arm flange 652 extending out from the first arm 640 along the third slide axis 90. The second arm 641 comprises a second arm flange 653 extending out from the second arm 641 along the third slide axis 90. The first arm flange 652 comprises an elongated first arm flange aperture 654 and the second arm flange 653 comprises an elongated second arm flange aperture 655. The first handle standoff shaft 650 is moveable within the elongated first arm flange aperture 654 along the third slide axis 90 and the second handle standoff shaft 651 is moveable within the elongated second arm flange aperture 655 along the third slide axis 90. One of the third pair of lens mount screws 646 is traversed through the first arm flange 652 and into the first handle standoff shaft 650 and the other of the third pair of lens mount screws 646 is traversed through the second arm flange 653 and into the second handle standoff shaft 651, locking the lens mount assembly 10 into place at the desired position. FIG. 21 shows the lens mount support 64 locked in a first position and FIG. 22 shows the lens mount support 64 locked in a second position.

Figure 23:
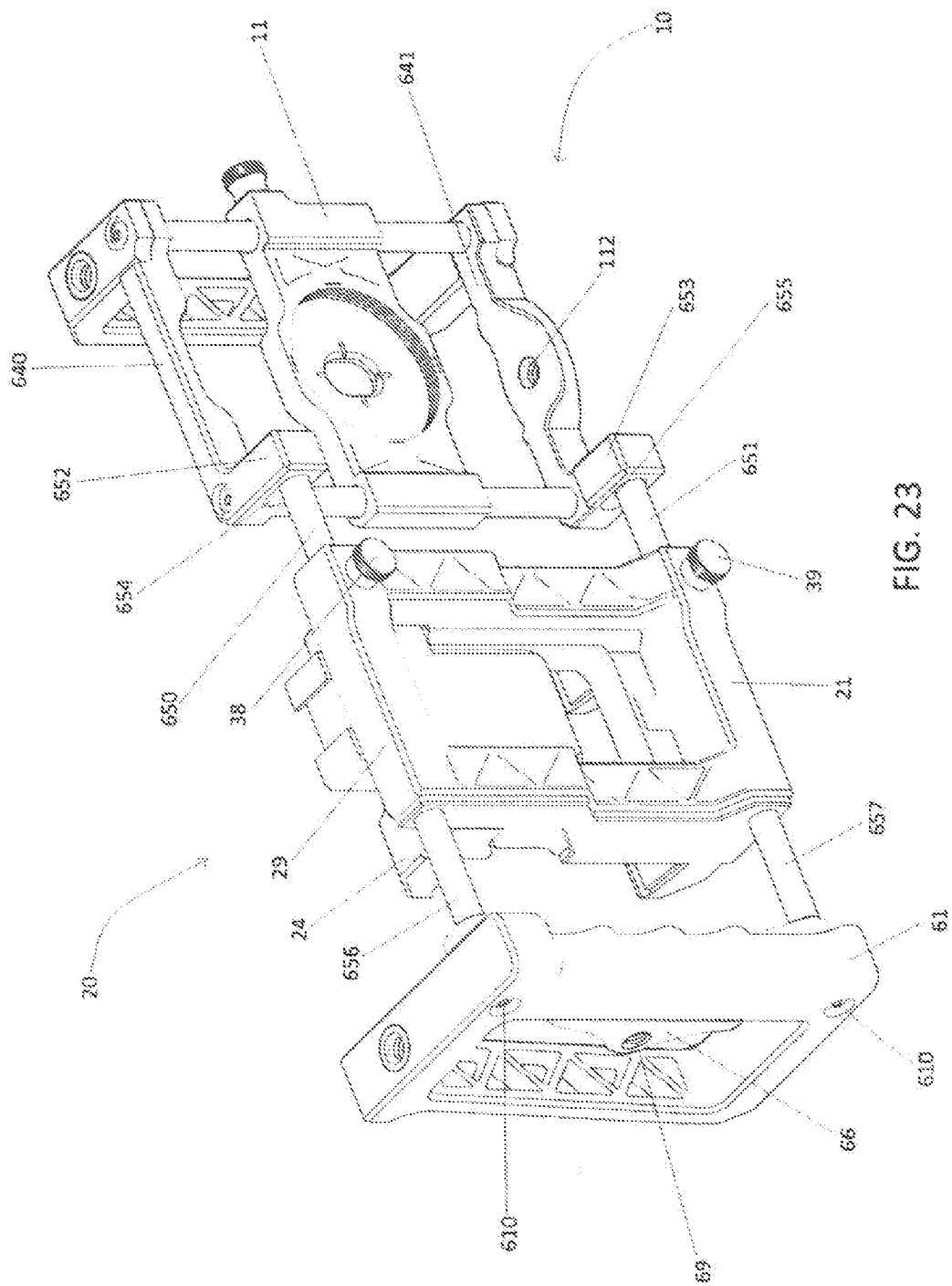
FIG. 23 is a perspective view of the second embodiment of the present disclosure, showing a vertical mount on the first handle.

In reference to FIG. 23, the lens mount support 64 further comprises a threaded second arm aperture 112. The threaded second arm aperture 112 is positioned into the second arm 641. The threaded second arm aperture 112 allows the universal adjustable lens adapter of the present disclosure to be mounted to a camera tripod, or similar stand, such that the smartphone can be stabilized to capture precise panoramic shots and pictures.

Figure 24:
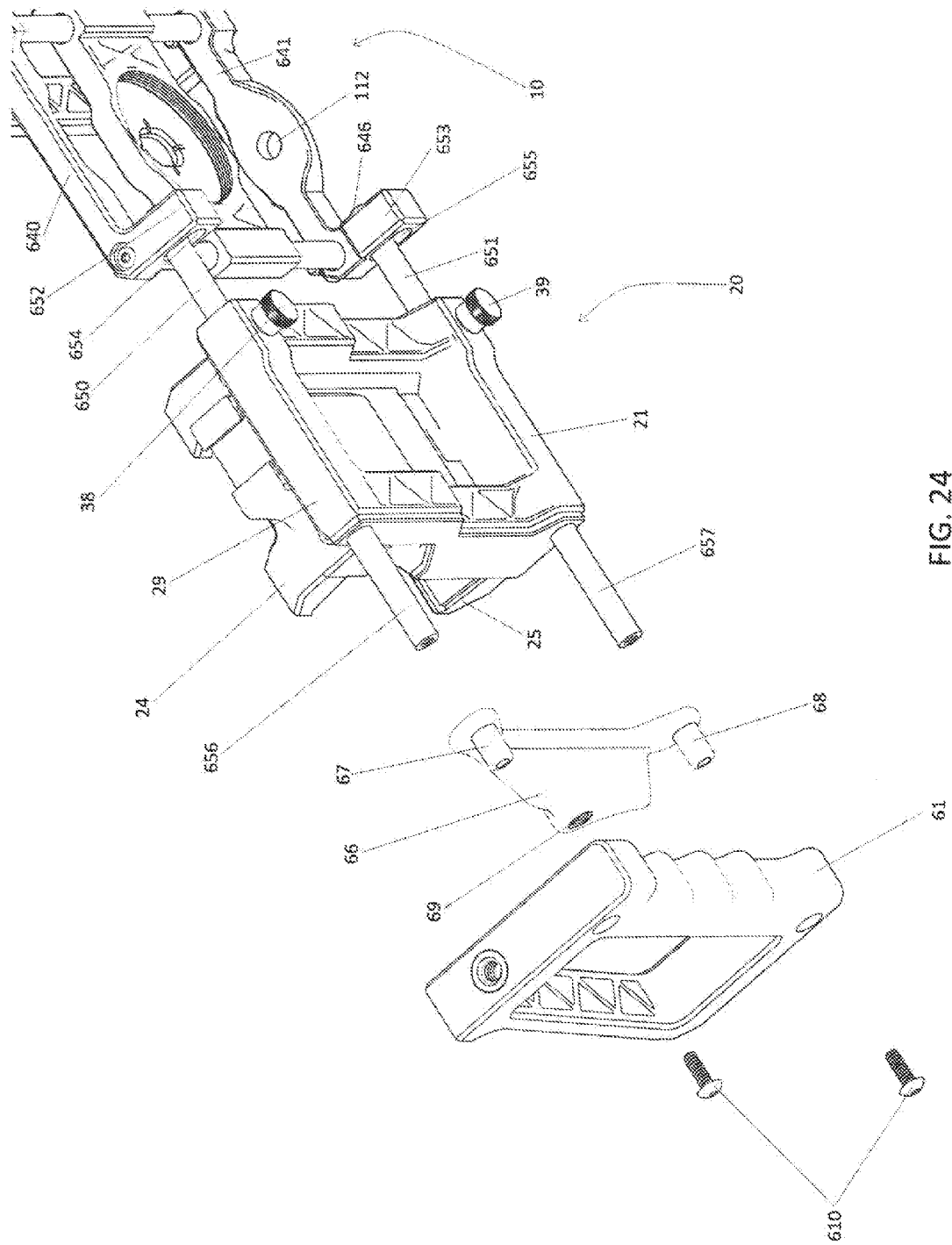
FIG. 24 is an exploded perspective view of the second embodiment of the present disclosure, showing the vertical mount positioned between the first handle and the clamp mount assembly.

In reference to FIGS. 23 and 24, the handle assembly 60 further comprises a vertical mount 66. The vertical mount 66 comprises a top vertical mount shaft 67, a bottom vertical mount shaft 68, and a threaded vertical mount aperture 69. The top vertical mount shaft 67 and the bottom vertical mount shaft 68 traverse through the first handle 61. The vertical mount 66 is then secured to the handle assembly 60 by attaching the clamp top standoff shaft 656 and the clamp base standoff shaft 657 to the vertical mount 66 and the first handle 61 using the first pair of handle screws 610. One of the first pair of handle screws 610 traverses through the first handle 61, the top vertical mount shaft 67, and the clamp top standoff shaft 656 and the other of the first pair of handle screws 610 traverses through the first handle 61, the bottom vertical mount shaft 68, and the clamp base standoff shaft 657, locking the vertical mount 66 into place as shown in FIG. 23. The threaded vertical mount aperture 69 allows the universal adjustable lens adapter of the present disclosure to be vertically mounted to a camera tripod, or similar stand, such that the smartphone can be vertically stabilized to capture pictures.

In order to use the second embodiment of the present disclosure, the first clamp grip 24 and the second clamp grip 25 are adjusted to the dimension of the smartphone or electronic device being used. The first clamp grip 24 is secured at the desired location of one of the at least two pairs of first clamp threaded apertures 26 by traversing the pair of first clamp grip screws 28 through the pair of first clamp grip threaded apertures 27 and engaging one of the at least two pairs of first clamp threaded apertures 26. The second clamp grip 25 is secured at the desired location of one of the at least two pairs of second clamp threaded apertures 55 by traversing the pair of second clamp grip screws 57 through the pair of second clamp grip threaded apertures 56 and engaging one of the at least two pairs of second clamp threaded apertures 55. A smartphone is then positioned in the clamp mount assembly 20 against the second clamp 23 while the first clamp 22 is pulled away from the clamp base 21, as shown in FIG. 8, wherein the first compression spring 30 and the second compression spring 33 are compressed within the clamp base 21. The first clamp 22 is then released, wherein the first compression spring 30 and the second compression spring 33 are allowed to decompress within the clamp base 21, thus pulling the first clamp 22 towards the clamp base 21 against the smartphone. In turn, the smartphone is clamped securely in between the first clamp 22 and the second clamp 23, as shown in FIG. 9.

Once the smartphone is positioned in between the first clamp 22 and the second clamp 23, the user can use the clamp mount assembly 20 alone or in combination with the lens mount assembly 10. To use the clamp mount assembly 20 in combination with the lens mount assembly 10, the user slides the lens mount support 64 along the third axis 90 to accommodate lenses of different heights. The first handle standoff shaft 650 is positioned at the desired location within the elongated first arm flange aperture 654 and the second handle standoff shaft 651 is positioned at the desired location within the elongated second arm flange aperture 655. The lens mount support 64 is locked into place by traversing one of the third pair of lens mount screws 646 through the first arm flange 652 and engaging the first handle standoff shaft 650 and traversing the other of the third pair of lens mount screws 646 and engaging the second handle standoff shaft 651.

In order to horizontally align the camera lens with the aperture 111 of the lens mount base 11, the user slides the clamp base 21 along the first handle standoff shaft 650 and the second handle standoff shaft 651. When the camera lens has been aligned with the aperture 111, the third thumb screw 38 is threaded through the top threaded aperture 36 in the clamp base 21 and the fourth thumb screw 39 is threaded through the bottom threaded aperture 37 in the clamp base 21 until the third thumb screw 38 engages the first handle standoff shaft 650 and the fourth thumb screw 39 engages the second handle standoff shaft 651. In turn, the clamp base 21 is locked in position along the first handle standoff shaft 650 and the second handle standoff shaft 651.

The user can also attach the first handle extension standoff shaft 47 and the second handle extension standoff shaft 48 to increase the distance between the clamp mount assembly 20 and the lens mount assembly 10 and accommodate smartphones or electronic devices of a larger size. The first handle extension standoff shaft 47 engages the first handle standoff shaft 650 on the end opposite the clamp mount support 65 and the second handle extension standoff shaft 48 engages the second handle standoff shaft 651 the one end opposite the clamp mount support 65. The first handle extension standoff shaft 47 and the second handle extension standoff shaft 48 traverse through the top standoff shaft aperture 53 and the bottom standoff shaft aperture 54 in the clamp base 21. The user then slides the clamp base 21 along the first handle extension standoff shaft 47 and the second handle extension standoff shaft 48 in order to horizontally align the camera lens with the aperture 111 of the lens mount base 11. When the camera lens has been aligned with the aperture 111, the third thumb screw 38 is threaded through the top threaded aperture 36 in the clamp base 21 and the fourth thumb screw 39 is threaded through the bottom threaded aperture 37 in the clamp base 21 until the third thumb screw 38 engages the first handle extension standoff shaft 47 and the fourth thumb screw 39 engages the second handle extension standoff shaft 48. In turn, the clamp base 21 is locked in position along the first handle extension standoff shaft 47 and the second handle extension standoff shaft 48.

With the camera lens horizontally aligned with the aperture 111, the lens mount base 11 is then slid along the first lens mount standoff shaft 642 and the second lens mount standoff shaft 644 in order to vertically align the aperture 111 with the camera lens. Once the aperture 111 has been vertically aligned with the camera lens, the lens mount thumb screw 13 is threaded through the lens mount base 11 until the lens mount thumb screw 13 engages either the first lens mount standoff shaft 642 or the second lens mount standoff shaft 644. In turn, the lens mount base 11 is locked in position along the first lens mount standoff shaft 642 and the second lens mount standoff shaft 644. A lens or accessory, such as a macro lens, fish eye lens, or wide angle lens can then be attached to the lens mount ring 12, as shown in FIG. 10. Other camera accessories, such as a flash, tripod, stabilizers, or microphones, can then be attached to the present disclosure via the cold shoe mount 50, the threaded clamp base insert 52, the plurality of threaded handle inserts, the threaded second arm aperture 112, or the threaded vertical mount aperture 69.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A universal adjustable lens adapter comprising:
   a lens mount assembly comprising a lens mount base and a lens mount ring, the lens mount ring adjacently connected to the lens mount base;
   a clamp mount assembly;
   a handle assembly comprising a clamp mount support, a lens mount support, a first handle, and a second handle, wherein:
      the lens mount base slidably connected to the lens mount support along a first slide axis;
      the clamp mount assembly is slidably attached to the clamp mount support along a second slide axis;
      the clamp mount support is adjacently and removably connected to the lens mount support;
      the first handle is adjacently and removably attached to the clamp mount support opposite the lens mount support;
      the second handle is adjacently attached to the lens mount support opposite the clamp mount support; and
      the first slide axis and the second slide axis are aligned perpendicular to each other.

2. The universal adjustable lens adapter of claim 1, wherein:
   the lens mount support comprises an adjustable first handle standoff shaft and an adjustable second handle standoff shaft; and
   the clamp mount support is slidably and removably attached to the first handle standoff shaft and the second handle standoff shaft.

3. The universal adjustable lens adapter of claim 1, wherein:
   the lens mount support comprises an adjustable first handle standoff shaft and an adjustable second handle standoff shaft;
   the adjustable first handle standoff shaft comprises a removable first handle extension standoff shaft;
   the adjustable second handle standoff shaft comprises a removable first handle extension standoff shaft; and
   the clamp mount support is slidably and removably attached to the first handle extension standoff shaft and the second handle extension standoff shaft.

4. The universal adjustable lens adapter of claim 1, wherein:
   the lens mount support comprises an adjustable first handle standoff shaft and an adjustable second handle standoff shaft;
   the adjustable first handle standoff shaft comprises a removable first handle extension standoff shaft;
   the adjustable second handle standoff shaft comprises a removable first handle extension standoff shaft;
   the clamp mount assembly comprises a clamp base slidably attached to the clamp mount support;
   the clamp base is slidably and removably attached to the first handle extension standoff shaft and the second handle extension standoff shaft;
   the clamp base further comprises a top thumb screw and a bottom thumb screw;
   the top thumb screw and the bottom thumb screw are positioned into the clamp base;
   the top thumb screw is positioned adjacent to the first handle extension standoff shaft; and
   the bottom thumb screw is positioned adjacent to the second handle extension standoff shaft.

5. The universal adjustable lens adapter of claim 1, wherein:
   the clamp mount assembly further comprises a clamp base, a first clamp, a first clamp grip, a pair of first clamp grip screws, and a second clamp, the first clamp and the second clamp being positioned opposite each other along the clamp base;
   the first clamp comprises at least two pairs of first clamp threaded apertures;
   the first clamp grip comprises a pair of first clamp grip threaded apertures;
   the first clamp grip is adjustably and removably attached to the first clamp along the first slide axis; and
   the pair of first clamp grip screws are positioned into the pair of first clamp grip threaded apertures and one pair of the at least two pairs of first clamp threaded apertures.

6. The universal adjustable lens adapter of claim 1, wherein:
   the clamp mount assembly further comprises a clamp base, a first clamp, a second clamp, a second clamp grip, and a pair of second clamp grip screws, the first clamp and the second clamp being positioned opposite each other along the clamp base;
   the second clamp comprises at least two pairs of second clamp threaded apertures;
   the second clamp grip comprises a pair of second clamp grip threaded apertures;

the second clamp grip is adjustably and removably attached to the second clamp along the first slide axis; and the pair of second clamp grip screws are positioned into the pair of second clamp grip threaded apertures and one pair of the at least two pairs of second clamp threaded apertures.

7. The universal adjustable lens adapter of claim 2, wherein:
the lens mount support comprises a first arm and a second arm, the first arm and the second arm being positioned opposite each other along the lens mount support;
the first arm comprises a first arm flange extending out from the first arm along a third slide axis;
the second arm comprises a second arm flange extending out from the first arm along the third slide axis;
the third slide axis is aligned perpendicular to the first slide axis and the second slide axis the first arm flange comprises an elongated first arm flange aperture;
the second arm flange comprises an elongated second arm flange aperture;
the first handle standoff shaft is moveably positioned within the elongated first arm flange aperture; and
the second handle standoff shaft is moveably positioned within the elongated second arm flange aperture.

8. The universal adjustable lens adapter of claim 1, wherein:
the lens mount support comprises a first arm and a second arm, the first arm and the second arm being positioned opposite each other along the lens mount support; and
the second arm comprises a threaded second arm aperture.

9. The universal adjustable lens adapter of claim 1, wherein:
the handle assembly further comprises a vertical mount;
the clamp mount support further comprises a clamp top standoff shaft and a clamp base standoff shaft;
the vertical mount comprises a threaded vertical mount aperture; and
the vertical mount is removably positioned along the clamp top standoff shaft and the clamp base standoff shaft between the first handle and the clamp mount support.

10. The universal adjustable lens adapter of claim 9, wherein:
the vertical mount further comprises a top vertical mount shaft and a bottom vertical mount shaft; and
the top vertical mount shaft and the bottom vertical mount shaft are removably attached to the first handle.

11. The universal adjustable lens adapter of claim 7, wherein:
the first handle standoff shaft is moveable between a first position and a second position within the elongated first arm flange aperture; and
the second handle standoff shaft is moveable between a third position and a fourth position within the elongated second arm flange aperture.

12. The universal adjustable lens adapter of claim 2, wherein:
the clamp mount support further comprises a top thumb screw and a bottom thumb screw;
the top thumb screw and the bottom thumb screw are positioned into the clamp mount support;
the top thumb screw is positioned adjacent to the first handle standoff shaft; and
the bottom thumb screw is positioned adjacent to the second handle standoff shaft.

13. The universal adjustable lens adapter of claim 3, wherein:
the clamp mount support further comprises a top thumb screw and a bottom thumb screw;
the top thumb screw and the bottom thumb screw are positioned into the clamp mount support;
the top thumb screw is positioned adjacent to the first handle extension standoff shaft; and
the bottom thumb screw is positioned adjacent to the second handle extension standoff shaft.

14. The universal adjustable lens adapter of claim 7, wherein:
the first handle standoff shaft is locked in a first position within the elongated first arm flange aperture by a first arm screw; and
the second handle standoff shaft is locked in a second position within the elongated second arm flange aperture by a second arm screw.

15. The universal adjustable lens adapter of claim 10, wherein:
the top vertical mount shaft is secured to the first handle by a top vertical mount screw; and
the bottom vertical mount shaft is secured to the first handle by a bottom vertical mount screw.

\* \* \* \* \*